（12） United States Patent
Kohlhepp

(10) Patent No.: US 10,152,760 B2
(45) Date of Patent: Dec. 11, 2018

(54) METHODS FOR AN AUTONOMOUS ROBOTIC MANUFACTURING NETWORK

(71) Applicant: Christoph Adam Kohlhepp, Mount Riverview (AU)

(72) Inventor: Christoph Adam Kohlhepp, Mount Riverview (AU)

( * ) Notice: Subject to any disclaimer, the term of this patent is extended or adjusted under 35 U.S.C. 154(b) by 283 days.

(21) Appl. No.: 15/201,637

(22) Filed: Jul. 5, 2016

(65) Prior Publication Data

US 2017/0307387 A1    Oct. 26, 2017

Related U.S. Application Data

(60) Provisional application No. 62/347,443, filed on Jun. 8, 2016, provisional application No. 62/345,801, filed on Jun. 5, 2016.

(51) Int. Cl.

| | | |
|---|---|---|
| *G01C 21/34* | (2006.01) | |
| *G05B 19/4155* | (2006.01) | |
| *G06Q 50/18* | (2012.01) | |

(52) U.S. Cl.
CPC ......... *G06Q 50/18* (2013.01); *G05B 19/4155* (2013.01); *G05B 2219/31368* (2013.01)

(58) Field of Classification Search
None
See application file for complete search history.

(56) References Cited

U.S. PATENT DOCUMENTS

| | | | | |
|---|---|---|---|---|
| 5,953,707 | A * | 9/1999 | Huang | G06Q 10/06 705/7.25 |
| 7,054,706 | B2 * | 5/2006 | Kempf | G06Q 10/087 700/108 |
| 8,126,767 | B1 * | 2/2012 | Aldridge | G06Q 10/04 705/7.36 |
| 9,110,460 | B2 * | 8/2015 | Magagnini | G05B 19/418 |
| 9,678,502 | B2 * | 6/2017 | Taylor | G05B 19/41835 |
| 2002/0165744 | A1 * | 11/2002 | Juras | G06Q 10/06 705/7.37 |
| 2003/0014314 | A1 * | 1/2003 | Griep | C23C 14/0623 705/15 |

(Continued)

OTHER PUBLICATIONS

U.S. Appl. No. 15/186,474, Christoph Adam Kohlhepp.

*Primary Examiner* — Kenny S Lin

(57) ABSTRACT

A computer-implemented method for operating a robotic manufacturing network, comprising: (a) providing a communications network; (b) providing a plurality of computer processor nodes for processing data wherein said computer processor nodes are participants on said communication network; (c) providing a plurality of manufacturing facilities; (d) providing a plurality of transport agents connecting said manufacturing facilities; (e) providing a plurality of actors selected from the group consisting of said manufacturing facilities and said transport agents wherein said actors are participants in said robotic manufacturing network and communicate on said communications network; (f) providing a robotic capability model as manufacturing supply chain planning service whereby autonomous manufacturing supply chain functionality is created that transforms product specifications into optimized manufacturing production plans thereby permitting products to be made by a population of networked manufacturing agents.

20 Claims, 13 Drawing Sheets

(56) References Cited

U.S. PATENT DOCUMENTS

| | | | | |
|---|---|---|---|---|
| 2004/0128176 A1* | 7/2004 | Jordan | ................... | G06Q 10/04 |
| | | | | 705/7.22 |
| 2004/0243266 A1* | 12/2004 | Mata | ............... | G05B 19/41865 |
| | | | | 700/99 |
| 2006/0047454 A1* | 3/2006 | Tamaki | .................. | G06Q 10/06 |
| | | | | 702/84 |
| 2007/0050070 A1* | 3/2007 | Strain | .................... | G06Q 10/06 |
| | | | | 700/99 |
| 2008/0167743 A1* | 7/2008 | Volant | ................... | G06Q 10/06 |
| | | | | 700/99 |
| 2009/0048889 A1* | 2/2009 | Arinez | .................. | G06Q 10/06 |
| | | | | 705/7.22 |
| 2010/0023355 A1* | 1/2010 | Sagalow | ............... | G06Q 40/08 |
| | | | | 705/4 |
| 2010/0094793 A1* | 4/2010 | Ocke | ...................... | G06N 5/025 |
| | | | | 706/47 |
| 2014/0067693 A1* | 3/2014 | Alvarez Hernandez | ..................... | |
| | | | | G06Q 10/101 |
| | | | | 705/301 |
| 2014/0277683 A1* | 9/2014 | Gupta | ..................... | G06F 17/50 |
| | | | | 700/132 |
| 2017/0031335 A1* | 2/2017 | Sakakibara | ............ | G05B 15/02 |

\* cited by examiner

FIG. 15

METHODS FOR AN AUTONOMOUS ROBOTIC MANUFACTURING NETWORK

CROSS-REFERENCE TO RELATED APPLICATIONS

The present application claims priority to Australian Provisional Patent Application serial number 2016901517, filed on Apr. 24, 2016 and Australian Provisional Patent Application serial number 2016901696, filed on 8 May, 2016 and U.S. Provisional Patent Application Ser. No. 62/347,443, filed on Jun. 8, 2016 and U.S. Provisional Patent Application Ser. No. 62/345,801, filed on Jun. 5, 2016, the disclosures of which are hereby incorporated in their entirety at least by reference.

COPYRIGHT NOTICE

A portion of the disclosure of this patent document contains material, which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

TECHNICAL FIELD

The present disclosure relates generally to systems, apparatuses, and methods for manufacturing products using an inter-network of automated manufacturing facilities.

BACKGROUND

Models of manufacturing have mirrored prevalent models of social organization throughout history. The feudal system saw artisan based manufacture of goods, hand-made, non-interchangeable, and without an industry of scale. The industrial revolution brought scale and standardization to manufacturing. It also transferred the hierarchical structure of the feudal system to the dominant form of organization of the industrial age: the corporation. With advances in technology and associated skill demanded from workers in the industrial age, the peasant became literate. Machines facilitated an economy of scale but embodied no skills of their own. Skilled, educated workers were required to operate them. At the end of the 20th century, the advent of the computer replaced industrial production using skilled workers and machines with industrial production using computerized machines and unskilled workers. This in turn has led to an outflow of manufacturing jobs from developed nations to the emerging world. The next phase will see autonomous machines largely without a requirement for the unskilled worker. This process is under way now and manufacturing jobs are under pressure even in the emerging world. Another realm of economics has undergone a similar transformation in the more recent past: information. The catalyst of that transformation was the Internet. During the industrial revolution the group of so-called Luddites riled against job losses among artisans. Now the argument against job losses is much the same. Yet against the argument of the Luddites who would oppose progress and technology stands the testimony of time: the Internet created entirely new segments of economic activity and entirely new types of employment opportunities in the field of information; just like the Industrial Revolution did before. The present disclosure is about proactively managing just this type of transition for manufacturing and adding employment opportunities through automation, not as it is traditionally seen merely subtracting them. Manufacturing, as an industry, has strategic and military significance for any nation. No nation ought to expect to be significant in the theater of world affairs without it. Windows of opportunity, both economic and military, will close for nations in the years that lie ahead. And windows of opportunity will open for nations.

Traditional models of manufacturing utilize the "push-strategy." What this means is a model of distribution whereby a fixed selection of branded products is "pushed" along a supply and distribution chain that ends with retailers making products available to end consumers according to brand and model. The term "end consumer" is rooted in this model in that the consumer is at the end of this chain. The consumer selects from a fixed set of choices manufactured on an economy of scale. This model makes customized solutions expensive because custom solutions potentially require tailoring all the way along the supply chain, thus negating the benefits of an economy of scale.

Information used to be distributed according to the "push-strategy"—until the Internet replaced this model of information dissemination with a "pull-strategy." An example will illustrate: An Internet user lives in London, England, and is looking for a restaurant through a search engine. To start, the search engine will have "pulled in" the user's IP address information from a global database of available Internet addresses and presented a UK search page. This is the first customization. The search engine did not create this global database of Internet addresses, nor did it subcontract its making. Rather, it "pulled in" an available service offering. Based on location information, restaurant offerings in the area are presented in the search results—along with a map, marking nearby retailers and restaurants. The search engine did not create that map either. Rather, it will have resorted to a service offering from yet a third provider. The final user experience is the result of multiple layers of information being composed dynamically as they are "pulled in" from independent service offerings. Information technologists refer to this as a Service Oriented Architecture (SOA). Each layer of information is not pre-determined like in the assembly of an industrial product, but rather it is determined dynamically in response to user requests. As a consequence, the end result is customized on a per user basis by default. Only 30 years ago it would have been contrary to established wisdom that this paradigm would prevail against the established "push-strategy" model. Today it is known that the "pull-strategy" prevailed.

In addition to the "pull-strategy" and composition of service offerings on the Internet operating as described, behind the scenes a layered architecture handles the various processes that facilitate interoperability of various concerns in the system. This layered architecture is called the Open System Interconnection Model (OSI). The OSI model layers "meta information" along-side actual information and uses that meta information to coordinate the various services on the Internet. For example, information routing and domain name lookups are ancillary processes, which are managed by the OSI model.

Service Oriented Architectures on the Internet tend to be centralized, and in same cases distributed. Continuing with the example of domain name look-ups, top-level country domains are resolved through so called root name servers. These represent the central authority for each top-level domain. Non-root name servers cache the information from root name servers and disseminate this information according to a defined protocol in such a manner as to balance the workload away from the root name servers. The overall authority over the domain name system remains centralized. In contrast to centralized methodologies, so-called peer-to-peer technologies have emerged on the Internet as a means of decentralized information management. Such technologies include decentralized file sharing as well as cryptographic currencies based on "Blockchain" techniques. Other examples include decentralized contract settlement, also via blockchain techniques. Blockchain techniques involve the use of cryptography. Cryptography on the Internet is used to provide non-repudiation, authentication and confidentiality.

Communicating Sequential Processes (CSP) is a formal computer language for describing patterns of interaction in concurrent systems in terms of a process calculus. This process calculus permits describing of and reasoning about the behavior of processes and their interaction algebraically. Failures-Divergences Refinement (FDR) is a proof checker, which permits verification of CSP models and their properties. CSP and FDR can be used to define protocols of interaction between concurrent processes.

BRIEF SUMMARY OF THE INVENTION

The described technology concerns a customer driven, autonomous inter-network of robotic manufacturing facilities, which forms an autonomous supply chain.

The described technology is formulated as a mathematical model in the process calculus CSP. The described technology is referred to as the Supply Chain Interconnection Model (SCIM). At its core is the Robotic Capability Model as defined in the patent "Robotic Capability Model for Artificial Intelligence Assisted Manufacturing Supply Chain Planning."

The Supply Chain Interconnection Model (SCIM) derives its productivity multiplier from labor micro specialization, the relative collocation of collaborating agents and their swift and continual inter-operation as directed by the core services proposed by the model.

The Supply Chain Interconnection Model seeks to maximize both localization of the manufacturing supply chain as well as involvement of small enterprise manufacturers while offering customers bespoke product manufacturing on an economy of scale.

Many of the details, functions and other features shown and described in conjunction with this description are illustrative implementations of particular embodiments of the present disclosure. Accordingly, other embodiments can have other details, functions and features without departing from the spirit and scope of the present disclosure. In addition, those of ordinary skill in the art will appreciate that further embodiments of the present disclosure can be practiced without several of the details described below.

Certain details are set forth in the descriptions of FIGS. 1-15 to provide a thorough understanding of various embodiments of the present disclosure. A person of ordinary skill in the relevant art will understand that the present disclosure may have additional embodiments that may be practiced without several of the details described below. In other instances, those of ordinary skill in the relevant art will appreciate that the methods and systems described can include additional details without departing from the spirit or scope of the disclosed embodiments.

BRIEF DESCRIPTION OF THE DRAWINGS

FIG. 15. is a screenshot depicting the execution of a formal proof check of emergent properties of the process model of the described technology in one embodiment of the present invention.

DETAILED DESCRIPTION

Figure 1:
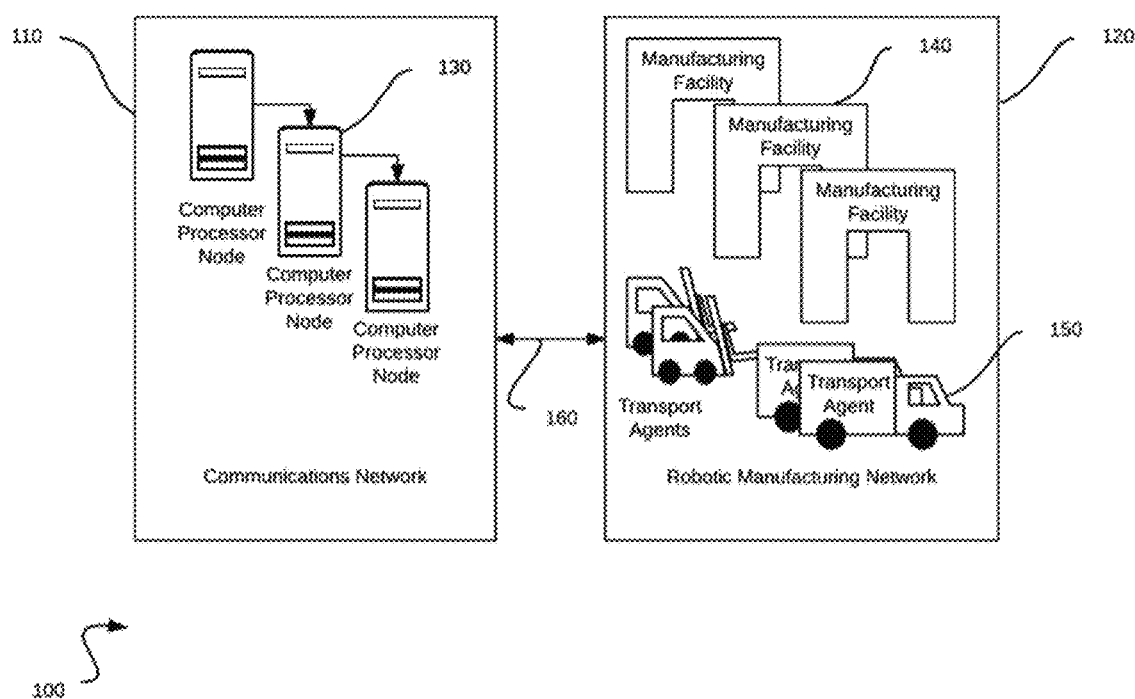
FIG. 1. is a diagram showing the relationship between the communications network and the physical parts of the robotic manufacturing network architecture in one embodiment of the present invention.

Referring to the diagram 100 of FIG. 1, depicting the relationship between the communications network and the physical robotic manufacturing network, the described technology employs a network 110 of computer nodes 130 which communicate 160 with transport agents 150 and manufacturing facilities 140. Transport agents 150 and manufacturing facilities 140 are collectively referred to as "Actors" within the mathematical model (CSP) of the described technology. Transport agents 150 are also referred to as "Mobile Actors" in said mathematical model whereas manufacturing facilities 140 are referred to as "Manufacturing Actors."

Figure 2:
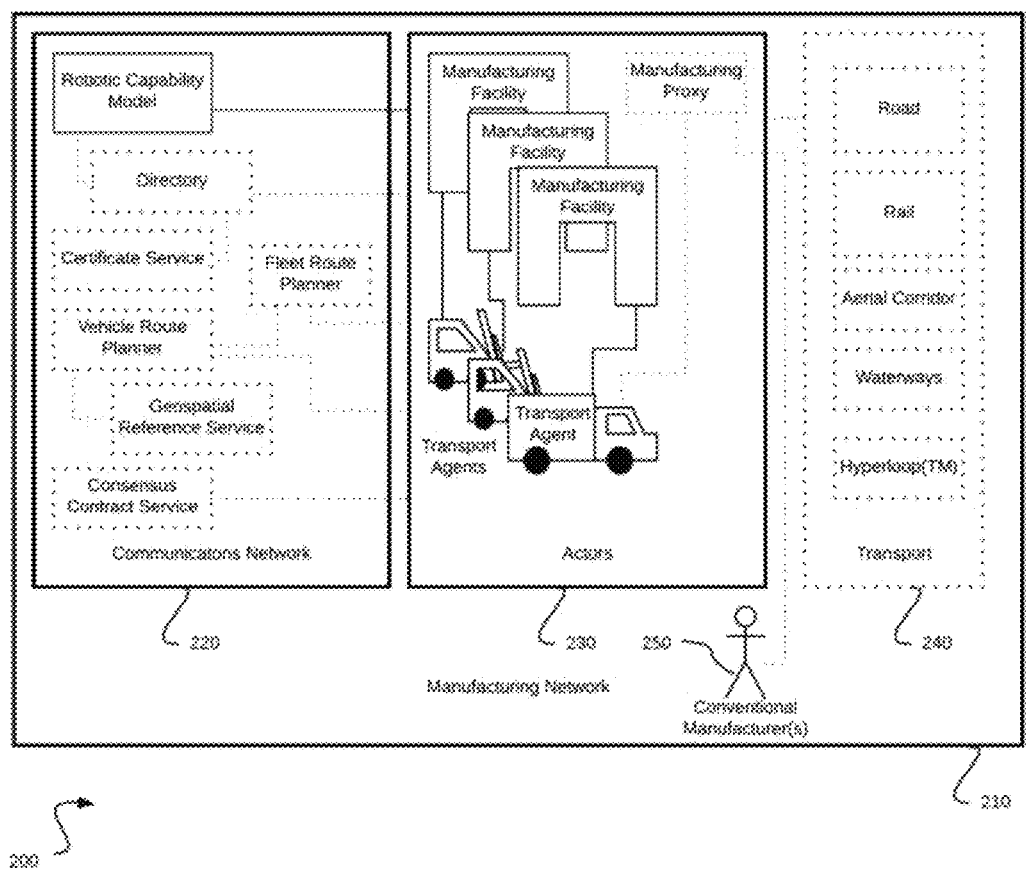
FIG. 2. is a diagram showing the service oriented architecture within a layered interconnectivity model as well as the relationship between the services of the model and other elements of the described technology in one embodiment of the present invention.

Referring to the diagram 200 of FIG. 2, depicting the manufacturing network using a service-oriented architecture 220, the described technology employs a layered interconnectivity model (here shown vertically layered) between the services of the communications model 220 of the network and actors 230 of the model. Actors in turn relate to conventional manufacturers 250 and to the physical transport model 240. Physical transport 240 may involve road systems, rail systems, aerial corridors, waterways, tubular transport systems and other transport routes.

Figure 3:
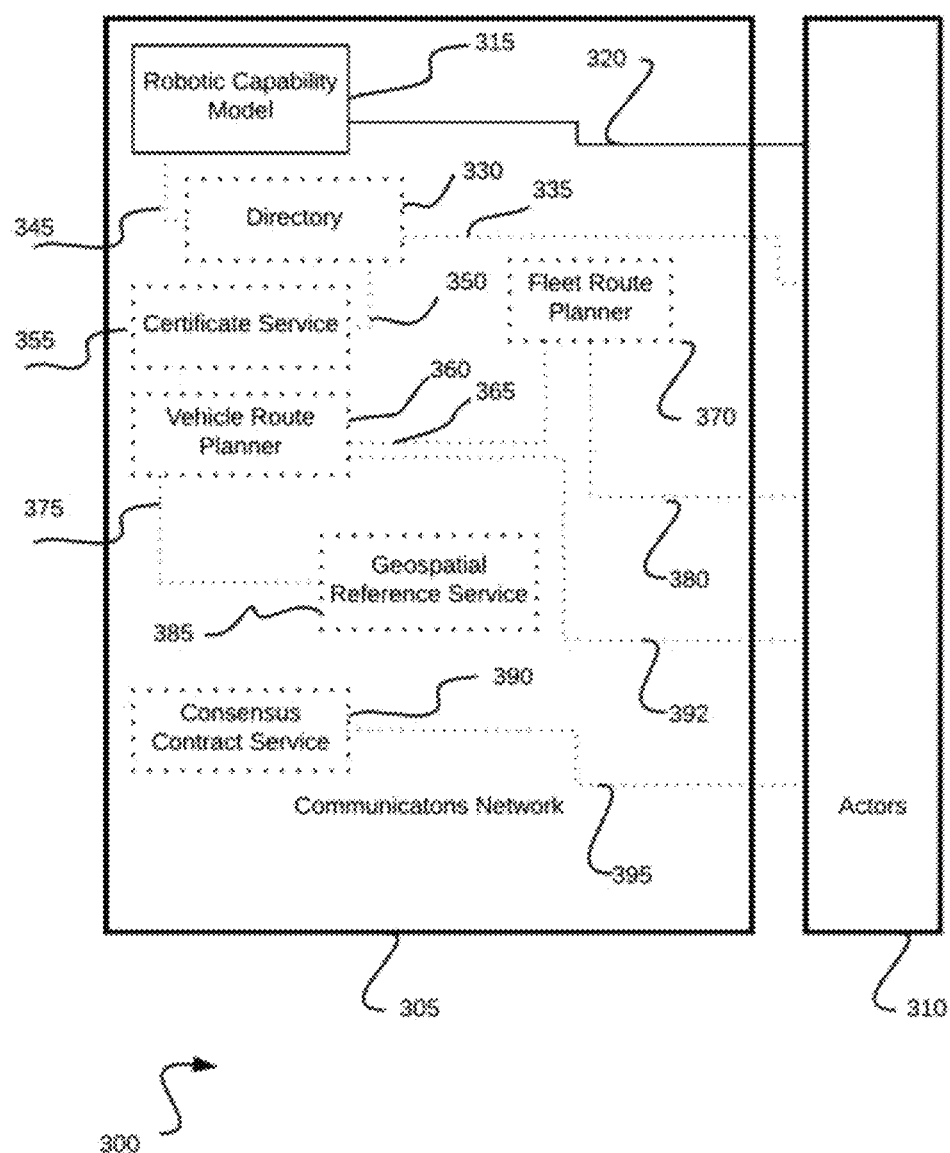
FIG. 3. is a diagram showing a detail view of the service oriented architecture of the described technology in one embodiment of the present invention.

Referring to the diagram 300 of FIG. 3, depicting a detail view of the service oriented architecture of the described technology, the Communication Network 305 accommodates the services that in the mathematical model of this disclosure are referred to as the "Supply Layer." The central service of the "Supply Layer" is the Robotic Capability Model 315, which is defined separately in the patent "ROBOTIC CAPABILITY MODEL FOR ARTIFICIAL INTELLIGENCE ASSISTED MANUFACTURING SUPPLY CHAIN PLANNING." The Robotic Capability Model 315 defines 320 capabilities of actors in the Actor model 310. The Directory Service 330 registers 335 actors 310 that offer capabilities defined 345 in the Robotic Capability Model 315. Registration in the Directory Service 330 may use authentication 350 via the Certificate Service 355. A Vehicle Route Planner service 360 and an optional Fleet Route Planner service 370, extending 365 said Vehicle Route Planner, optimize 392 & 380 the routing of actors 310. The Vehicle Route Planner service 360 may reference 375 a Geospatial Reference Service 385 (map). A Consensus Contract Service 390 may be used to negotiate 395 contracts for service with actor in the Actor model 310. Precise interaction between these services is discussed in the mathematical model entitled "Supply Layer Definition" of this disclosure.

Figure 4:
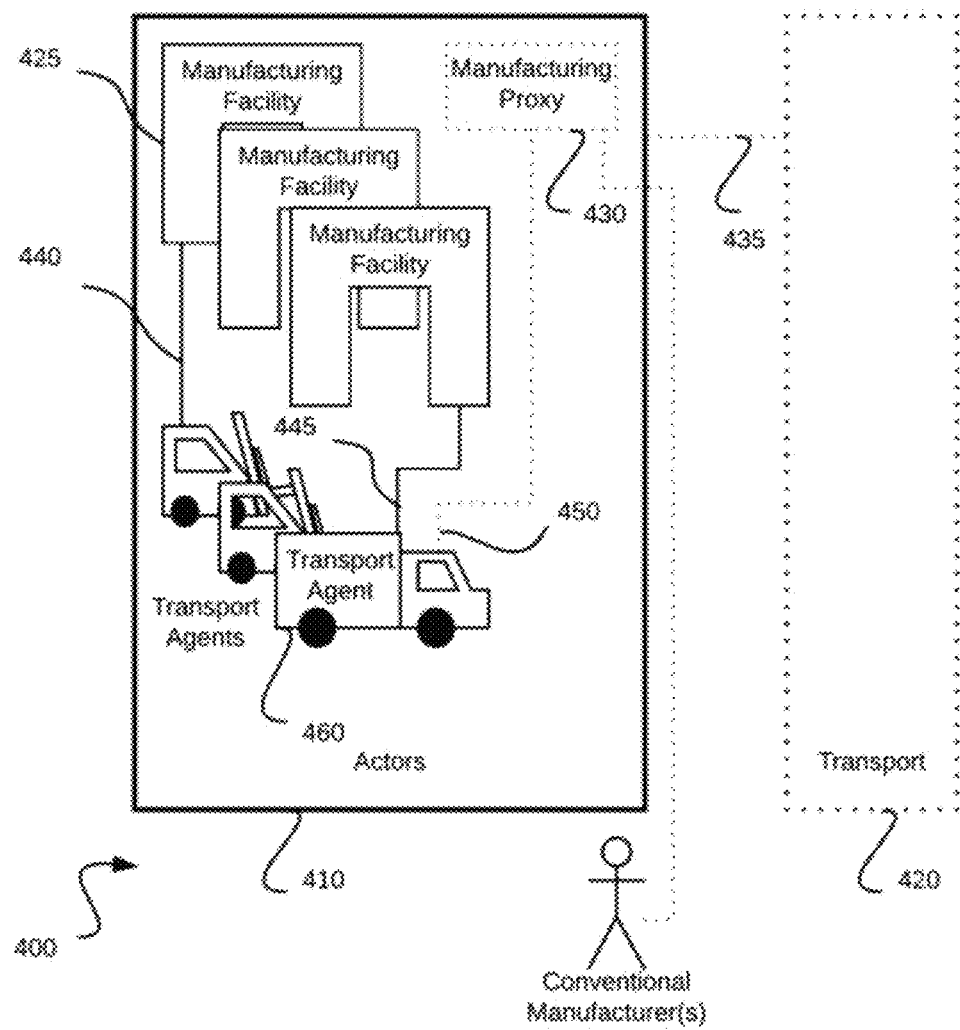
FIG. 4. is a diagram showing a detail view of the actor model of the described technology in one embodiment of the present invention.

Referring to the diagram 400 of FIG. 4, depicting a detail view of the Actor Model 410 of the described technology, the Actor Model 410 consists of manufacturing facilities 425 as well as transport agents 460. Transport agents permit manufacturing facilities 425 to interoperate by conveying materials and products to 440 and from 445 manufacturing facilities 425. This creates a physical network of interoperating agents or actors. Transport agents 460 and manufacturing facilities 425 are collectively referred to as "Actors" within the mathematical model (CSP) of the described technology. Transport agents 460 are also referred to as "Mobile Actors" in said mathematical model whereas manufacturing facilities 425 are referred to as "Manufacturing Actors." Manufacturing Proxies 430 may be used to integrate traditional and human actors into the model. The Actor Model relates 435 to the Transport Model. Precise interaction between these actors, transport and the "Supply Layer" discussed in paragraph [0033] is discussed in the mathematical model entitled "Actors Layer Definition" of this disclosure.

Figure 5:
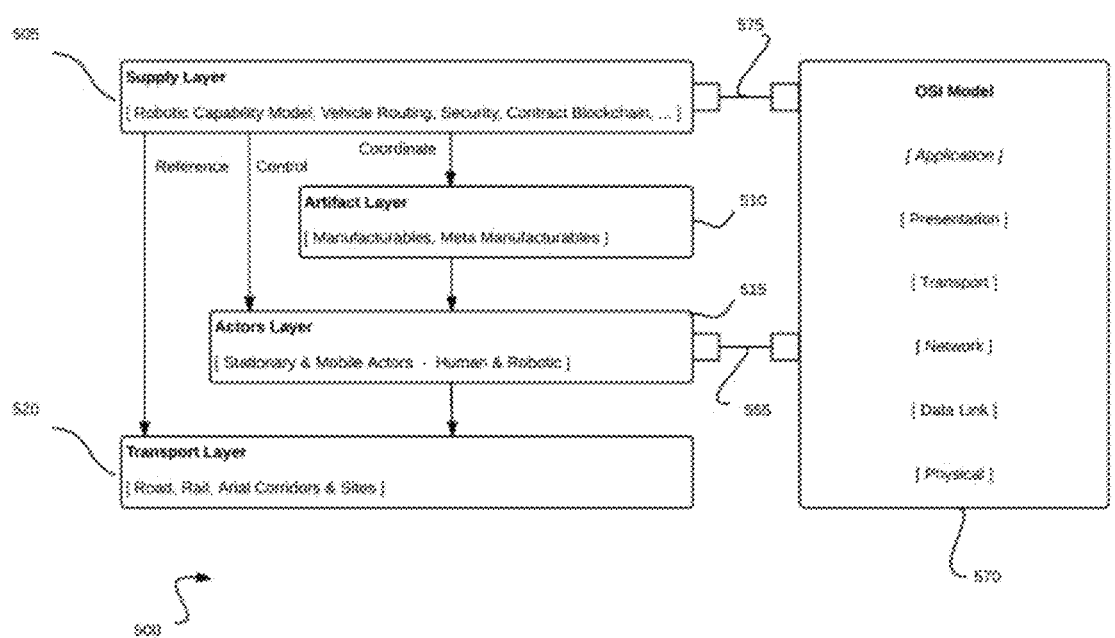
FIG. 5. is a diagram showing the Supply Chain Interconnection Model (SCIM) of the described technology in one embodiment of the present invention.

Referring to the diagram 500 of FIG. 5, depicting a diagram showing the Supply Chain Interconnection Model (SCIM) of the described technology, the Supply Chain Interconnection Model relates to the Communication Network as defined in the Internet's Open Systems Interconnection Model (OSI) 570. An interconnection model is a conceptual model that standardizes the communications functions between layers of the model. Hence services of the "Supply Layer" 505 as discussed in paragraph [0033] communicate with a group collectively termed actors 515 as discussed in [0034]. This group of actors communicates over a standardized set of messages—see "Actors Layer Definition" of this disclosure. Artifact Layer 510 and Transport Layer 520 are passive media, but serve functions in the mathematical description of the Supply Chain Interconnection Model (SCIM) in that actions defined on these layers (510 & 520) are precisely defined and serve to complete the function of the model as a whole. Interaction between the "Supply Layer" 505 and the "Actors Layer" 515 is via (575 & 555) the Open Systems Interconnection Model (OSI) 570 as embodied in the Communications Network.

Figure 6:
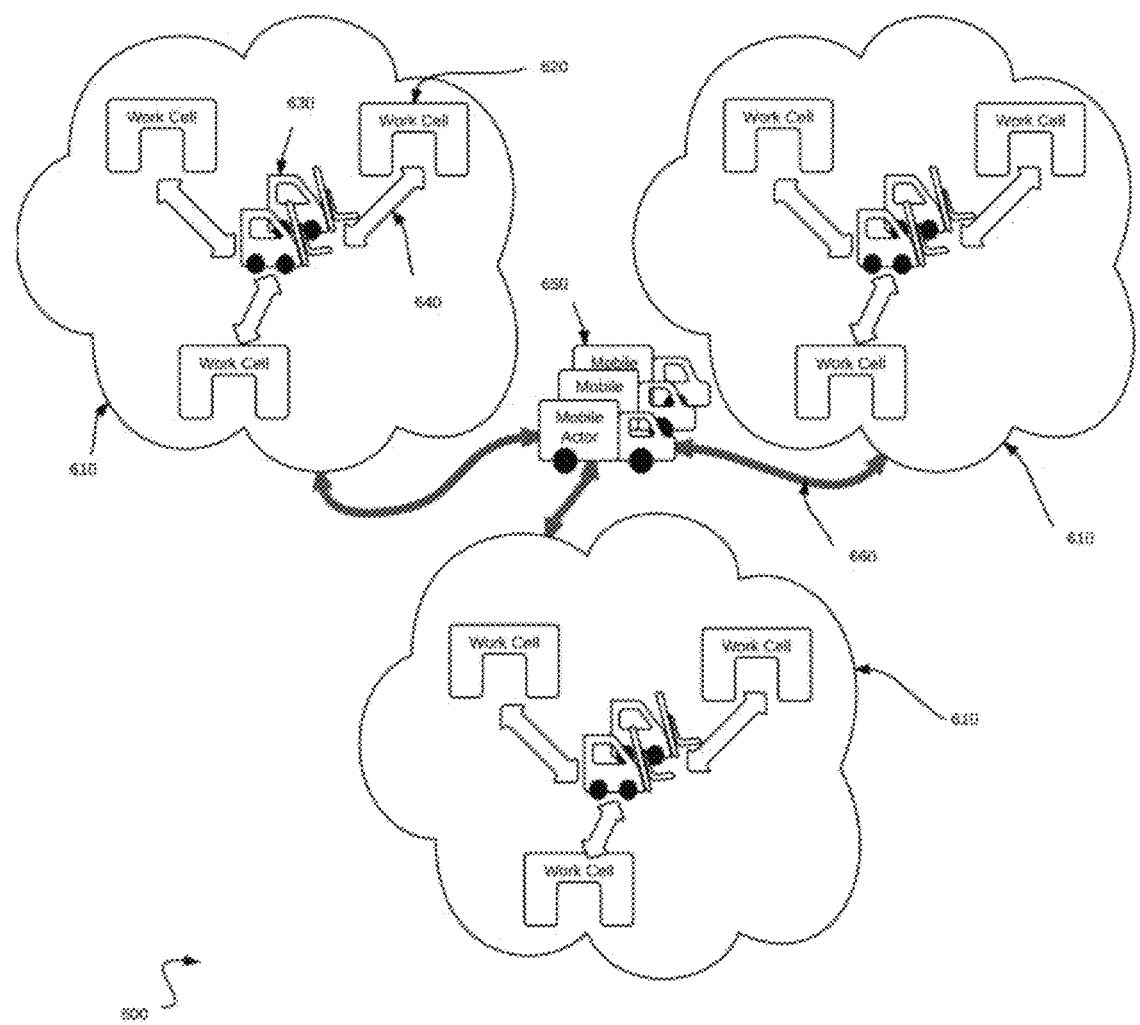
FIG. 6. is a diagram showing the Inter-Network Systems Model of the described technology in one embodiment of the present invention.

Referring to the diagram 600 of FIG. 6, depicting the Inter-Network Systems Model of the described technology, the Inter-Network Systems Model 600 describes the configuration of the Supply Chain Interconnection Model as described in [0035] on a wide area scale. This model groups manufacturing actors into local clusters 610 and divides transport actors into local mobile actors 630 and backbone mobile actors 650 and divides transport media into local transport media 640 and backbone transport media 660. Manufacturing actors in clusters are termed work cells 620. An examples of a local transport media 640 would be a floor routing systems while an example of a backbone transport medium 660 might be a tubular, loop transport system.

Figure 7:
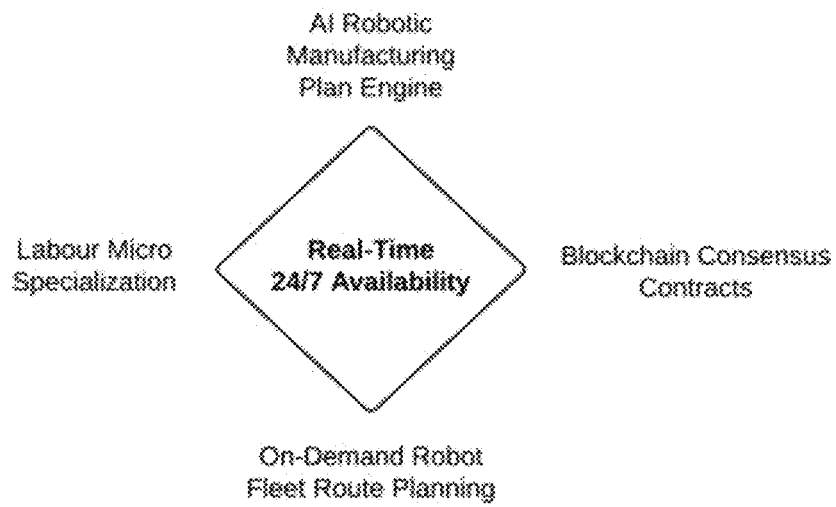
FIG. 7. is a diagram showing the SCIM "Tenets of Productivity Multiplication" of the described technology in one embodiment of the present invention.

Referring to FIG. 7, showing the SCIM "Tenets of Productivity Multiplication," the SCIM "Tenets of Productivity Multiplication" summarize key productivity multipliers of the described technology. These are described in paragraph [0052].

Figure 8:
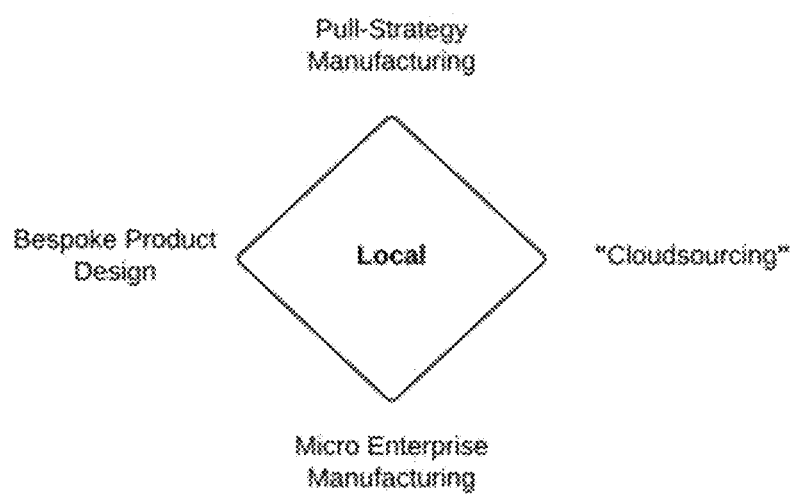
FIG. 8. is a diagram showing the SCIM "Tenets of Autonomous Manufacturing" of the described technology in one embodiment of the present invention.

Referring to FIG. 8, showing the SCIM "Tenets of Autonomous Manufacturing," the "Tenets of Autonomous Manufacturing" summarize key aspects of autonomous manufacturing within the described technology. These are described in [0053].

Figure 9:
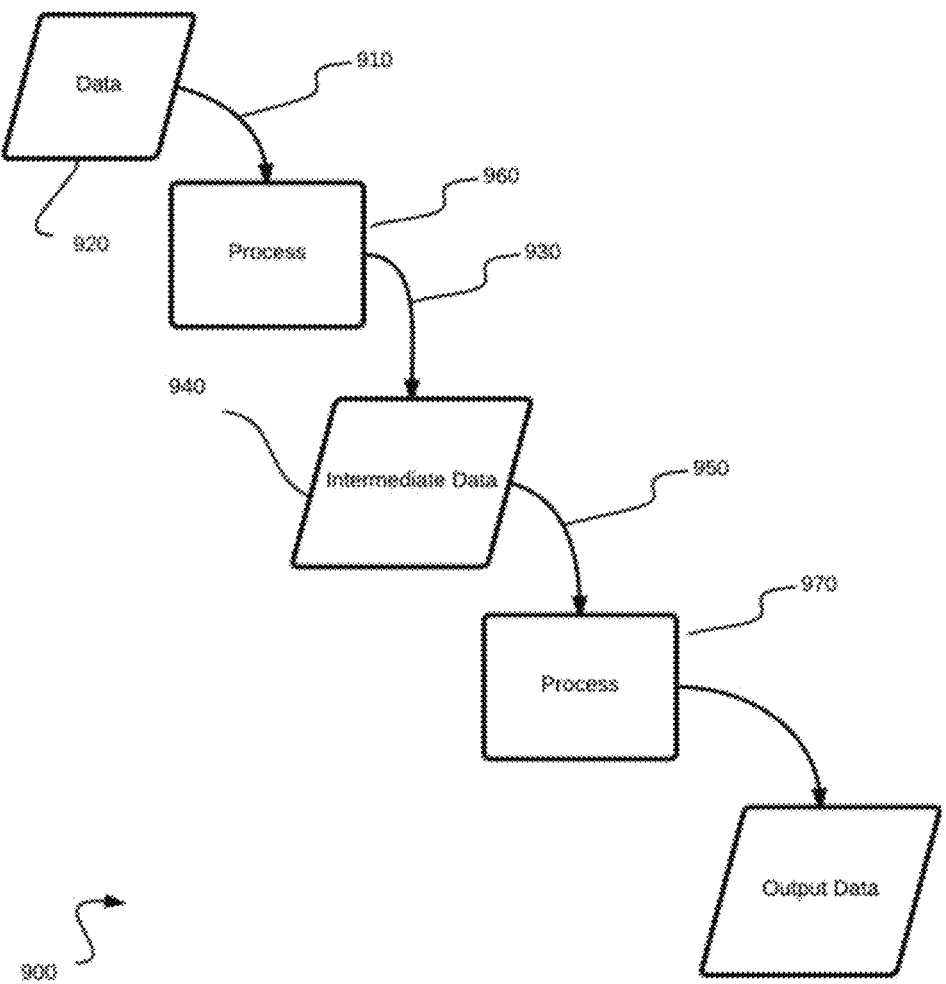
FIG. 9. is a diagram showing traditional (BACKGROUND) data flow in information systems in one embodiment of the present invention.

Referring to the diagram 900 of FIG. 9, depicting a diagram showing TRADITIONAL data flow in information systems, data flow in information systems in the pre "big data" era centered upon moving data 920 into processes (960 & 970) (input 910 and output 930) and communicating data between processes (inter-process-communication 930 & 950). This diagram relates to BACKGROUND information and is shown here to assist in explaining how the Supply Chain Interconnection Model (SCIM) and the Inter-Network Systems Model discussed in [0036] help solve the problem of scalability, and hence as it applies to manufacturing help solve the problem of multiplying productivity. A characterizing feature of this TRADITIONAL data flow model is that as data volume increases by orders of magnitude, moving intermediate data 940 become prohibitive. Moving the data 920 & 940 becomes costlier than moving the processes 960 and 970.

Figure 10:
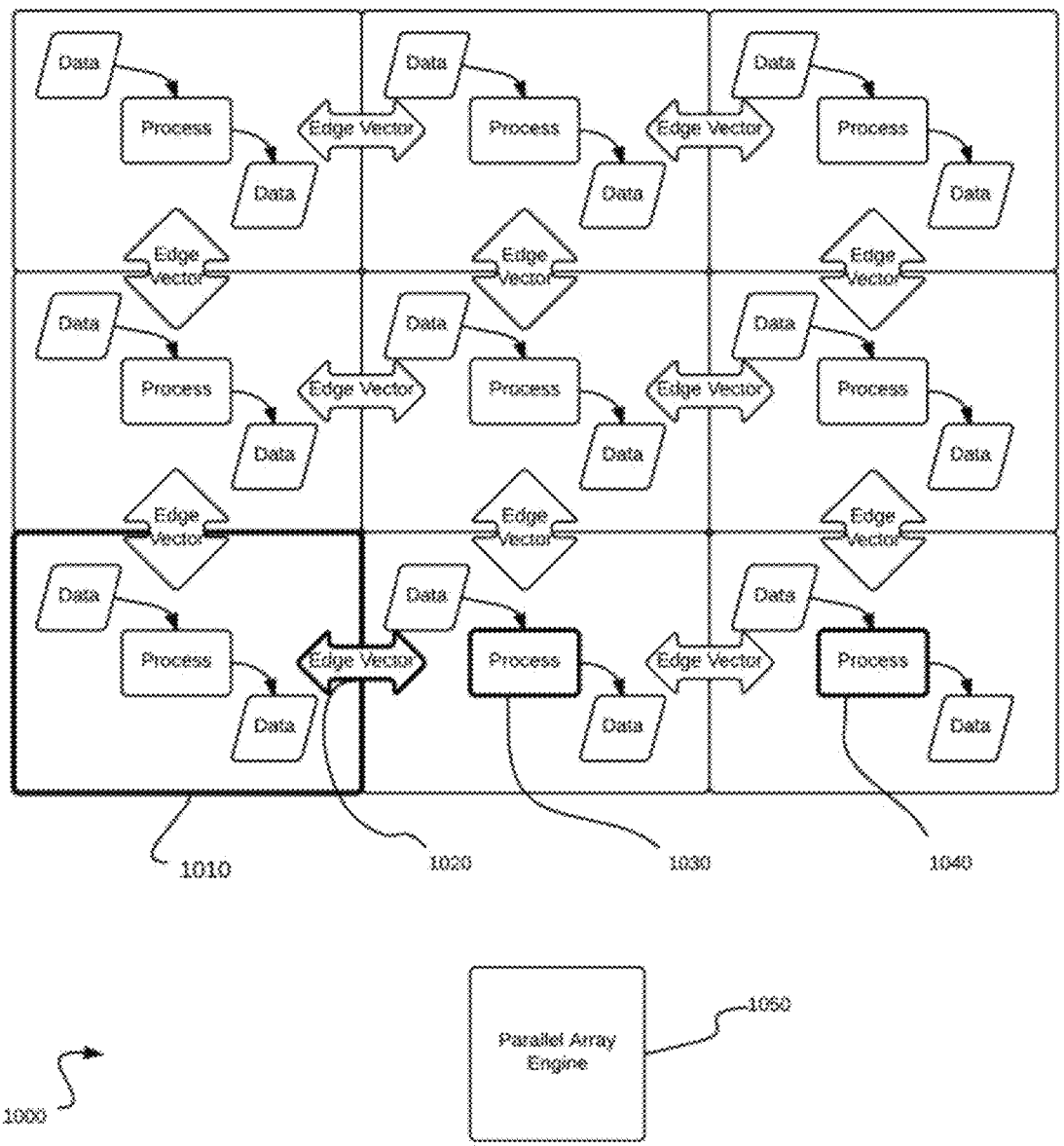
FIG. 10. is a diagram showing "big data" inversion of process and process overhead as used in traditional (BACKGROUND) information systems in one embodiment of the present invention.

Referring to the diagram 1000 of FIG. 10, depicting a diagram showing "big data" inversion of process and process overhead as used in TRADITIONAL information systems, "inversion of process and process overhead" means structuring process around the data they process. This diagram too relates to BACKGROUND information and is shown here to assist in explaining how the Supply Chain Interconnection Model (SCIM) and the Inter-Network Systems Model discussed in [0036] help solve the problem of scalability. In particular, "inversion of process and process overhead" means duplicating processes in processing cells called shards 1010 and managing overlapping data in so called edge vectors 1020. As data volume increases, process size remains the same. It is now more economical to duplicate processes. Coordination is via a "Parallel Array Engine" 1050 that coordinates edge vectors 1020 and processes 1030 & 1040.

Figure 11:
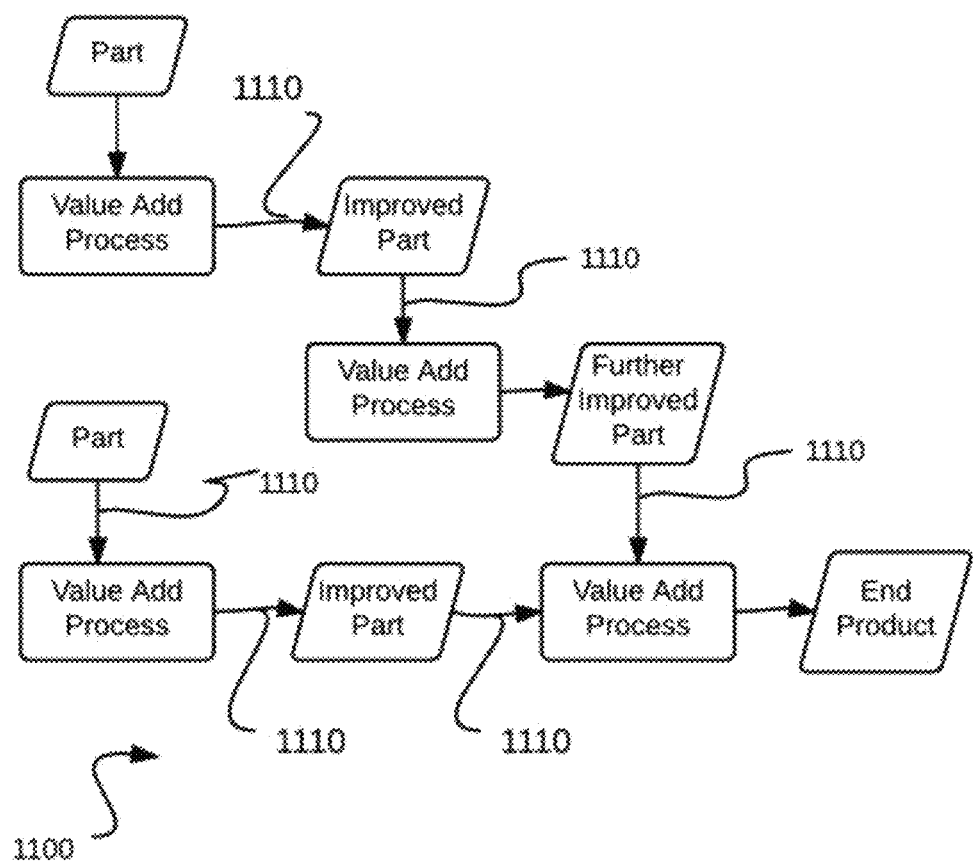
FIG. 11. is a diagram showing how the value add work flow in the traditional (BACKGROUND) supply chain model mirrors data flow in information systems in one embodiment of the present invention.

Referring to the diagram 1100 of FIG. 11, depicting how the TRADITIONAL supply chain model mirrors data flow in information systems, this diagram too relates to BACKGROUND information and is shown here to assist in explaining how the Supply Chain Interconnection Model (SCIM) and the Inter-Network Systems Model discussed in paragraph [0036] help solve the problem of scalability. Like its counterpart in information systems, the value add process in the TRADITIONAL supply chain model centers around moving parts from one value-add process to another. Scalability is limited by the costs and overheads of moving intermediate parts and products between value-add processes. Such overheads include distance and time. Further impacting may be regulatory difference between regions and or prevailing tariffs.

Figure 12:
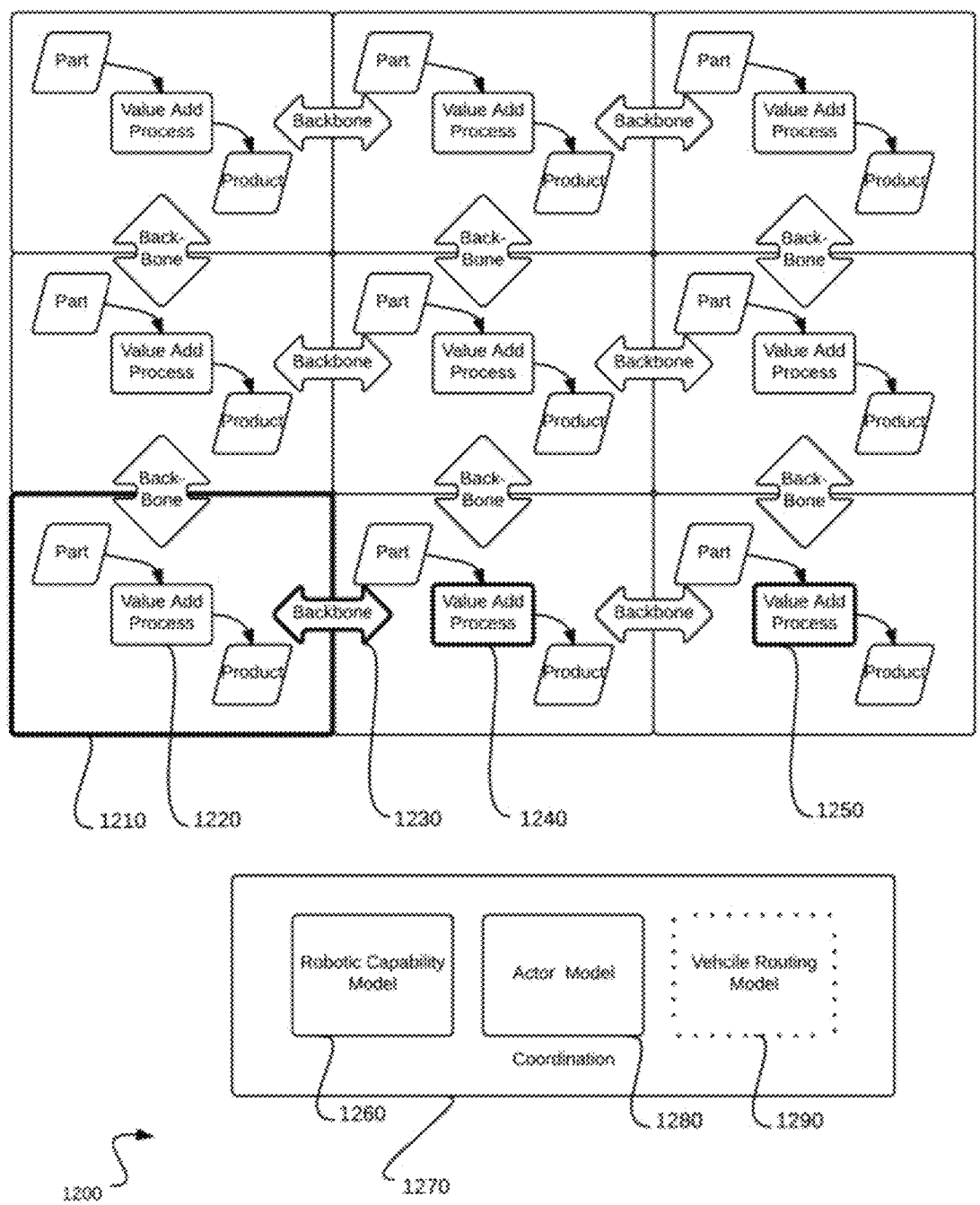
FIG. 12. is a diagram showing the principle of "Inversion of Process and Process-Overhead in Manufacturing" in the described technology in one embodiment of the present invention.

Referring to the diagram 1200 of FIG. 12, showing the principle of "Inversion of Process and Process Overhead in Manufacturing" in the described technology, the principle of "Inversion of Process and Process Overhead" solves the problems explained in paragraphs [0039], [0040] & [0041]. This is attained as follows: Local manufacturing clusters 1210 partition manufacturing activity into a grid. Value-Add processes 1220 & 1240 & 1250 . . . are duplicated across clusters. Solving the problem of "who does what & where" and overall optimization of the process is delegated to a coordinator 1270 comprising the Robotic Capability Model 1260, the Actor Model 1280 and optionally a Vehicle Routing System 1290. The principle of economy behind this process is analogous to "big data" information systems except that the prevalent push dynamic of information systems is replaced with a pull dynamic in manufacturing. Please refer to the section "Inversion of Processing and Processing Overhead" [0112] for a commentary on this dynamic.

Computing Environment of Services in the Supply Layer

Figure 13:
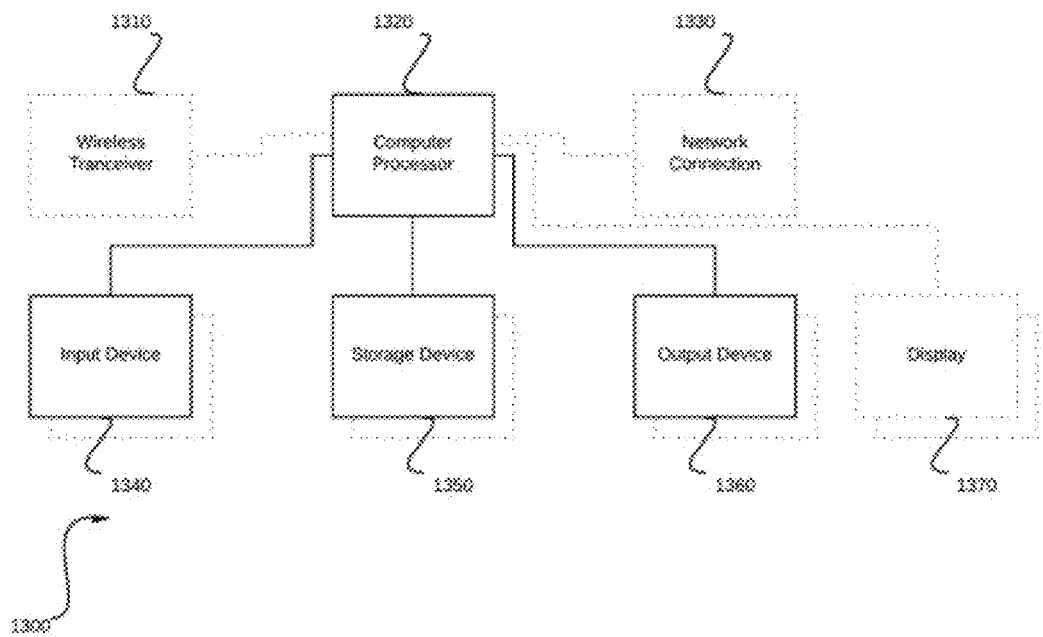
FIG. 13. is a hardware diagram showing components of a typical computer system on which elements of the described technology execute in one embodiment of the present invention.

FIG. 13 and the following discussion provide a brief general description of a suitable computing environment in which aspects of the described technology can be implemented. Although not required, aspects of the technology may be described herein in the general context of computer-executable instructions, such as routines executed by a general- or special purpose data processing device (e.g. a server or client computer). Aspects of the technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions; data structures, screen displays, and other data related to the technology may be distributed over the Internet or over other networks (including wireless networks) on a propagated signal on a propagation medium (e.g. an electromagnetic wave, a sound wave etc.) over a period of time. In some implementations, the data may be provided on any analog or digital network (e.g., packet-switched, circuit-switched, or other scheme).

The described technology can be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Those skilled in the relevant art will recognize that portions of the described technology may reside on a server computer, while corresponding portions reside on a client computer (e.g., PC, mobile computer, tablet, or smart phone). Data structures and transmissions of data particular to aspects of the technology are also encompassed within the scope of the described technology.

Referring to FIG. 13, the described technology employs a computer, such as a personal computer, workstation, phone, or tablet, having one or more processors 1320 coupled to one or more user input devices 1340 and data storage devices 1350. The computer is also coupled to at least one output device 1360, such as a display 1370. The computer may be coupled to external computers, such as via an optional network connection 1330, a wireless transceiver 1310, or both. For example, network hubs, switches, routers, or other hardware network components within the network connection 1330 and/or wireless transceiver 1310 can couple one or more computers.

The input devices 1340 may include a keyboard and/or a pointing device such as a mouse. Other input devices are possible. The storage devices 1350 may include any type of computer-readable media that can store data accessible to the computer, such as magnetic hard and floppy disk drives, optical disc drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to a node on a network, such as LAN, WAN, or the Internet (not shown in FIG. 13).

Figure 14:
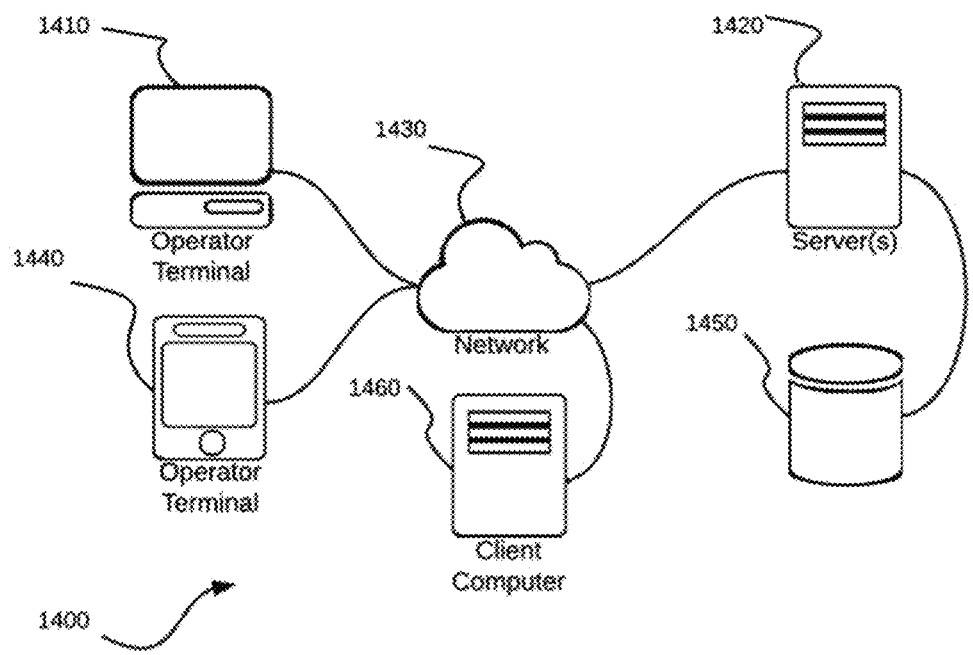
FIG. 14. is a diagram depicting an example environment within which elements of the described technology may execute in one embodiment of the present invention.

FIG. 14 is a diagram illustrating an example environment 1400 within which the described technology may operate. Environment 1400 may include operator terminals (nodes) 1410 and 1440, client computers (nodes) 1460 on a network 1430 from which operators may enter robotic capabilities, product specifications or request and receive manufacturing plans for product specifications. Servers 1450, in some embodiments, are dedicated or partially dedicated nodes that facilitate various aspects of the described technology. Servers 1450 may also be coupled to one or more databases 1420.

Supply Chain Model Overview

The implementation of the described technology is described in terms of the Communicating Sequential Processes (CSP) computer language. As a mathematical model of process, CSP can be used to specify the methods of processes in a mathematical way, without ambiguity. The model checker Failures-Divergences Refinement (FDR) is then used to analyze and demonstrate properties of those methods.

As implemented by the described technology, we define the Supply Chain Interconnection Model (SCIM) in terms of abstraction layers that characterize and standardize the interaction functions of the autonomous supply chain. The Supply Chain Interconnection Model coexists with and relates to the OSI Model of the Internet. It is separate from the OSI model, because its domain is manufacturing rather than telecommunications. We define the following layers of the Supply Chain Interconnection Model, beginning at the bottom; these will be elaborated herein as: Transport Layer; Agent Layer; Artifact Layer; and Supply Layer.

The Supply Chain Interconnection Model (SCIM) proposed here derives its productivity multiplier from labor micro specialization in the agent layer, the relative collocation of collaborating agents in the transport layer and their swift and continual inter-operation as directed by the supply layer. We term the design concepts underpinning this productivity multiplier the SCIM Tenets of Productivity Multiplication. Please refer to FIG. 7. Relative collocation of collaborating agents means that localization is favored over globalization. Localization coupled with labor micro specialization is a fundamental design tenet.

As a consequence of the pull-strategy model, the supply chain operates decoupled from traditional product ownership that is characteristic of present day "brand name" product marketing and push-strategy marketing. This enables end-user customizable products at essentially little or no additional costs compared to non-customized products. Please refer to FIG. 8. "Tenets of Autonomous Manufacturing".

While robotic agents are assumed, nothing about the design inherently precludes human agents. As long as human agents 250 integrate into the framework, they may function within it; please refer to FIG. 2. The model identifies proxies 430 to enable this; please refer to FIG. 4. It is assumed that mobile agents facilitating the networked aspect are robotic to warrant the productivity multiplier deriving from swift inter-operation of agents.

Further, because of the narrow specialization of labor and the uniform interface for all agents, it is envisaged that smaller businesses, who presently find themselves locked out of a largely global supply chain, may find niche markets in this model. Internet users will find this a familiar theme. Where newspapers and television channels used to dominate information dissemination, today even small bloggers can publish and have a voice.

Therefore, while at first glance human operators and small businesses may fear themselves deprecated, the model presented here CREATES OPPORTUNITY FOR THE LOCAL SUPPLY CHAIN TO COMPETE once more. Finally, traditional "push-strategy" manufacturers may OUTSOURCE PARTS OF THEIR MANUFACTURING SUPPLY CHAIN INTO THE "CLOUD," by delegating parts of their manufacture to Supply Chain Interconnection Model embedded manufacturing facilities. We term this "MANUFACTURING CLOUD SOURCING," inspired by the concepts of outsourcing and cloud computing.

In various embodiments, the Supply Chain Interconnection Model (SCIM) relates the different operational aspects of the Autonomous Supply Chain including a supply layer, an artifact layer, an actor layer, and a transport layer to each other and to the OSI model of the internet.

Supply Chain Interconnection Model Definition

The Supply Chain Interconnection Model (SCIM) is defined in terms of the process calculus CSP. The model defines the behavior and interaction between architectural layers in the model as well as services and agents within layers of the model.

TABLE 1

Supply Chain Interconnection Model expressed as CSP model

```
-- THE SUPPLY CHAIN INTERCONNECTION MODEL

SCIM = (( ACTORS                       -- Actors Layer
        [|{|TransportMediumAction|}|]  -- composed with:
        TRANSPORTS                     -- Transports Layer
        )
        [|{|ArtifactAction|}|]         -- composed with:
        ARTIFACTS                      -- Artifacts Layer
        )
        [|{|ActorMsg,CCFMAction,DIRMsg,GeoAction|}|] -- composed
        with:
        SUPPLY                         -- Supply Layer
```

The definition shown in Table 1 models the layered architecture shown in FIG. 5. CSP source code lines prefixed with double dashes are code comments and not a formal part of the model. Also defined are a series of actions and messages between the layers of the model that CSP terms an "event alphabet." In the above example, the ACTORS layer is a process or set of processes that interacts with the TRANSPORTS layer through TransportMediumAction events. CSP terms TransportMediumAction a channel that accommodates an event alphabet. Please refer to table 9 for its definition.

The Supply Chain Interconnection Model is intended to be deployed in a clustered fashion, combining local manufacturing centers with a transport backbone to achieve system scalability through a combination of distributed and centralized functions. FIG. 5. illustrates this. Various functions of the Supply Chain Interconnection Model will be distributed across this deployment model so as to the increase efficiency of the supply chain. This will be explained in later sections.

Actors Layer Definition

The Actors layer is a composition of both manufacturing actors and mobile actors. Mobile actors are transport agents that convey parts, products and materials. Manufacturing actors are stationary work cells that make parts, products and materials. The interaction of manufacturing actors and mobile actors is defined in the TransporterAction event alphabet. This alphabet will be used in section [0083]. It is defined in table 16. The ACTORS layer is defined as shown in Table 2.

TABLE 2

ACTORS Layer expressed as CSP model

```
-------------------------
-- ACTORS LAYER DEFINED
-------------------------
ACTORS = ManufacturingActor      -- manufacturing facilities
         [|{|TransporterAction|}|] -- composed with:
         MobileActor              -- transport agents
```

Transport Layer Definition

The Transports layer is the unsynchronized parallel combination of geospatial media. This includes static manufacturing sites termed work cells. Other media are possible, such as waterways. The TRANSPORT layer is defined as shown in table 3.

TABLE 3

TRANSPORT Layer expressed as CSP model

```
-------------------------
-- TRANSPORT LAYER DEFINED
-------------------------
TRANSPORTS = Road ||| Rail ||| ArialCorridor ||| WorkCell
```

Artifacts Layer Definition

Artifacts are things that are made. This includes physical artifacts, non-physical artifacts and meta artifacts. These are explained in section [0086]. The ARTIFACTS layer is defined as shown in table 4.

TABLE 4

ARTIFACTS Layer expressed as CSP model

```
--------------------------
-- ARTIFICT LAYER DEFINED
--------------------------
ARTIFACTS = PhysicalArtifact ||| NonPysicalArtifact ||| MetaArtifact
```

Supply Layer Definition

The SUPPLY layer accommodates the core functions of the Supply Chain Interconnection Model and coordinates the other layers. The SUPPLY layer is explained in section [0090]. The SUPPLY layer is defined as shown in table 5.

TABLE 5

SUPPLY Layer expressed as CSP model

```
------------------------
-- SUPPLY LAYER DEFINED
------------------------
SUPPLY = CCFM                    -- Consensus Contract-And-
                                 -- Feedback Model
       [|{|CertAct,CCFMAction|}|] -- composed with:
  (
    GEO                          -- Geopatial Model
       [|{|GeoActionRef|}|]       -- composed with:
    ( VRP                        -- Vehicle-Routing &
                                 -- Fleet-Optimization Model
       [|{|DIRMsg|}|]             -- composed with:
    ( CERT                       -- Certificate & Security Model
       [|{|CertAct|}|]
    ( DIR                        -- Directory Services Model
       [|{|RCMMsg,RCMReq|}|]
      RCM                        -- Robotic Capability Model
    )
    )
  )
)
```

Emergent Property Invariants

Crucially, CSP allows us to reason about the complex interaction of processes and behaviors. This means properties of the model may be warranted through what CSP calls assertions. A successful assertion in the model checker FDR discharges mathematical proof of the correctness of the model. Please refer to tables 6 through 9 for guarantees of correctness of the Supply Chain Interconnection Model. These are discharged in FIG. 15.

TABLE 6

Emergent Properties expressed as CSP model

```
-- Emerging properties are behaviors that arise out of the
-- composition of processes and their individual behaviors.
-- Here we stipulate emergent properties of the Supply Chain
-- Interconnection Model and its architectural layers.
-- The system as a whole must not deadlock, diverge (livelock)
-- or be non deterministic. Livelock occurs in unguarded recursion.
-- We stipulate that unguarded recursion must not exist in system.
assert SCIM :[deadlock free]
assert SCIM :[livelock free]
assert SCIM :[deterministic]
-- The Supply layer is deadlock and livelock free but principally
-- exhibits non-determinism based on interaction with the
-- Certificate & Security Model Individual actions may be refused
-- where authorization is declined. Therefore we require the
-- "SUPPLY is deterministic" assertion to be false.
assert SUPPLY :[deadlock free]
assert SUPPLY :[livelock free]
assert not SUPPLY :[deterministic]
```

TABLE 7

Emergent Properties expressed as CSP model continued

```
-- The Actors layer are deadlock and livelock free but principally
-- exhibits non-determinism. For example an actor may choose to self
-- service, i.e. a robot may elect to charge itself when energy
-- reserves are depleted. Therefore we require the "ACTORS is
-- deterministic" assertion to be false.
assert ACTORS :[deadlock free]
assert ACTORS :[livelock free]
assert not ACTORS :[deterministic]
-- Artifacts are expected to be deadlock free,
-- livelock free and deterministic.
assert ARTIFACTS :[deadlock free]
assert ARTIFACTS :[livelock free]
assert ARTIFACTS :[deterministic]
-- Transports is an unsynchronized parallel combination
-- of geospatial models. As such, we expect the combination
-- to be deadlock free, non diverging but not deterministic.
-- This arises because each process in the TRANSPORTS model
-- engages in fundamentally the same events but potentially
-- with staggered progression.
assert TRANSPORTS :[deadlock free]
assert TRANSPORTS :[livelock free]
assert not TRANSPORTS :[deterministic]
```

Discharging Mathematical Proof using a Model Checker

Figure 15:
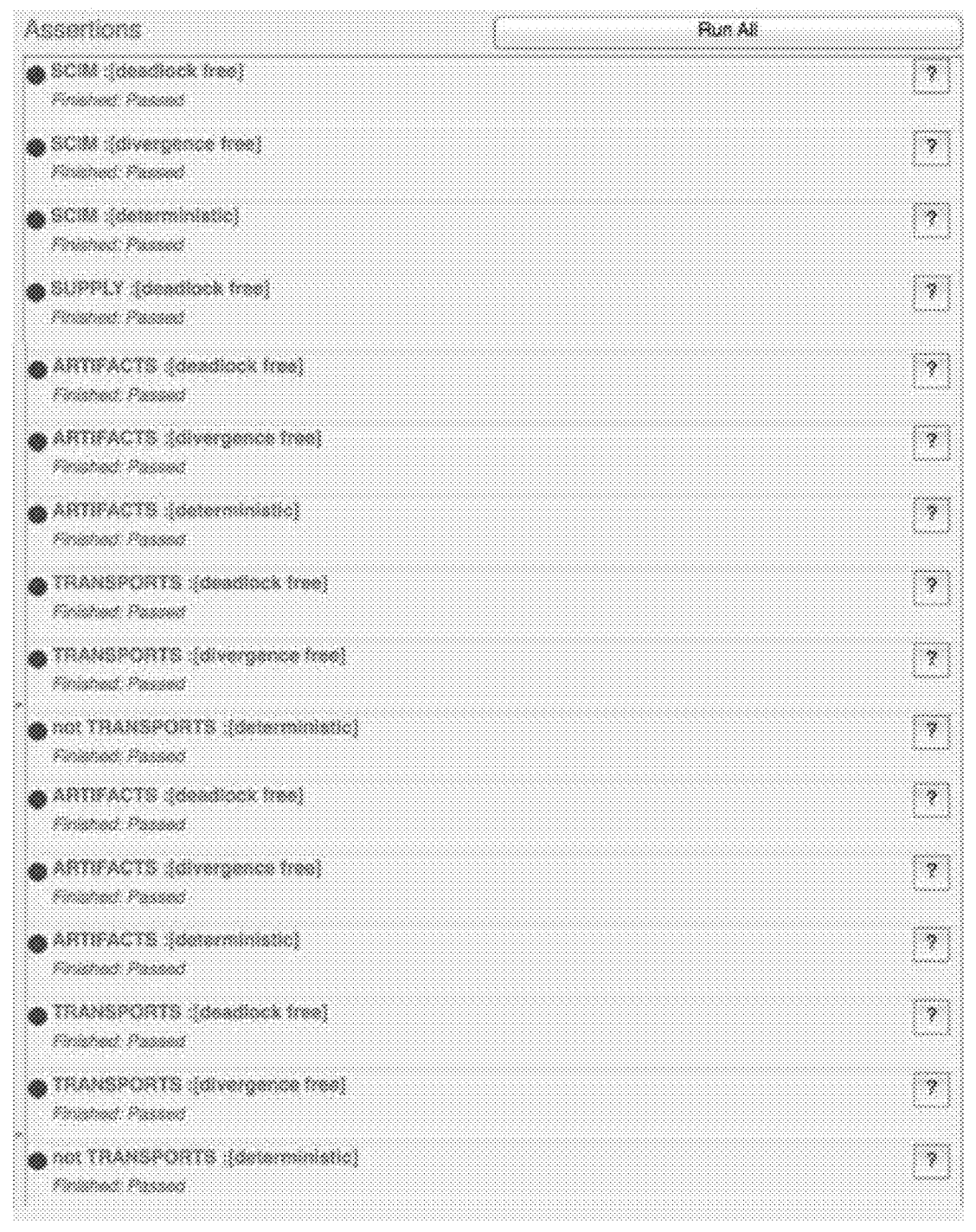

FDR permits us to verify CSP assertions through machine-checked proof. Please refer to FIG. 15. FIG. 15 shows the machine proof tool FDR (Failures Divergence Refinement) verifying each assertion, concluding each with the comment "Finished: Passed." What is verified here are emergent properties of the system rather than specific requirement constraints.

It is noted that the proofs discharged by FDR in FIG. 15 are in the context of definitions of process behaviors and their event alphabets that will be shown in subsequent sections.

Model Behavior Invariants

In addition to emergent properties, specific properties of individual actors may be verified. Table 8 shows examples of constraints, which may be enforced through what CSP terms "trace and failure refinement." Please refer to section [0082] for details of the Actors Layer.

TABLE 8

Specific Property Invariants expressed as CSP model

```
---------- Specific Property Invariants ----------------------------
-- In addition to emergent properties of the system as a whole, we
-- may stipulate specific behavior invariants
-- Here we stipulate that all actors must register.
-- We achieve this simply by asserting trace refinement
-- of the projections of all our actors to
-- the "must register specification."
MUSTREGISTER = ActorMsg.register -> MUSTREGISTER
assert MUSTREGISTER [T= Actor |\ {ActorMsg.register}
assert MUSTREGISTER [T= MobileActor |\ {ActorMsg.register}
assert MUSTREGISTER [T= ManufacturingActor |\ {ActorMsg.register}
-- We may also stipulate abstraction and refinement constraints.
-- For example a ManufacturingActor is an Actor. A MobileActor
-- is an Actor. The behavior of both must therefore refine
-- the behavior of Actor. We stipulate this in terms of
-- Trace and Failure refinement using algebraic event hiding.
------ Specification ----- Implementation
assert Actor                    [T= ManufacturingActor
                                     \
{|ManufactureReq,TransporterAction,ArtifactAction|}
assert Actor                    [F= ManufacturingActor
                                     \
{|ManufactureReq,TransporterAction,ArtifactAction|}
------ Specification ----- Implementation
assert Actor                    [T= MobileActor \
{|TransportReq,TransporterAction,TransportMediumAction|}
```

TABLE 8-continued

Specific Property Invariants expressed as CSP model

```
assert Actor              [F= MobileActor \
{|TransportReq,TransporterAction,TransportMediumAction|}
```

Transports Layer Elaboration

The Transports Layer is a physical layer which represents both fixed manufacturing sites as well as physical routes along which transport might take place: roads, rail & aerial corridors. The primary input of this layer into the model is geospatial reference data.

The transport layer defines this reference data in a manner that route planning and route optimization algorithms may consume it. There are many candidate implementations. One suggested implementation is through representation of geographic objects in an open source, object-relational database system. Scalability of this implementation to a national wide system can be either through "database sharding" or through interfacing to a "big data" system. Reference data may be sourced from freely editable maps of the World Relevant open source implementations accommodate open source routing solutions.

While the above implementation is but one possible configuration, characteristic of the Transport Layer is a geospatial database that interfaces to a routing optimization solution. The CSP definition of the Transport Layer is given in tables 9 through 13.

TABLE 9

Transport Model Defined expressed as CSP model

```
------ Transport Model Event Alphabet ------
datatype  TransportMediumType = travel | park | occupy | reference
datatype  TransportType = RoadType | RailType | ArialType
channel   TransportMediumAction : TransportMediumType
------ Transport Process Model ------
TransportModel =
  let
    Geospatial(UNMAPPED) =
        GeoAction.map -> Geospatial(MAPPED)
    Geospatial(MAPPED) =
        TransportMediumAction.travel -> Geospatial(MAPPED)
        [ ]
        TransportMediumAction.park -> Geospatial(MAPPED)
        [ ]
        TransportMediumAction.occupy -> Geospatial(MAPPED)
  within
    Geospatial(UNMAPPED)
------ Invariant ------
assert TransportModel :[deadlock free]
```

In Table 9 we define the event alphabet of the transport layer and the core states and events of an abstract transport medium. In tables 10 through 13 we refine the model for "Road," "Rail," "ArialCorridor," and "WorkCell."

TABLE 10

Road Transport Model expressed as CSP model

```
-- Road refines TransportModel
Road =
  let
    Geospatial(UNMAPPED) =
        GeoAction.map -> Geospatial(MAPPED)
    Geospatial(MAPPED) =
        TransportMediumAction.travel -> Geospatial(MAPPED)
        [ ]
        TransportMediumAction.park -> Geospatial(MAPPED)
  within
```

TABLE 10-continued

Road Transport Model expressed as CSP model

```
    Geospatial(UNMAPPED)
assert TransportModel \{|TransportMediumAction.occupy|} [T= Road
assert TransportModel \{|TransportMediumAction.occupy|} [FD= Road
```

TABLE 11

Rail Transport Model expressed as CSP model

```
-- Rail refines TransportModel
Rail =
  let
    Geospatial(UNMAPPED) =
        GeoAction.map -> Geospatial(MAPPED)
    Geospatial(MAPPED) =
        TransportMediumAction.travel -> Geospatial(MAPPED)
        [ ]
        TransportMediumAction.park -> Geospatial(MAPPED)
  within
    Geospatial(UNMAPPED)
------ Specification ----- Implementation
assert TransportModel
    \{|TransportMediumAction.occupy|}
             [T= Rail
assert TransportModel
    \{|TransportMediumAction.occupy|}
             [FD= Rail
```

TABLE 12

ArialCorridor Transport Model expressed as CSP model

```
-- ArialCorridor refines TransportModel
ArialCorridor =
  let
    Geospatial(UNMAPPED) =
        GeoAction.map -> Geospatial(MAPPED)
    Geospatial(MAPPED) =
        TransportMediumAction.travel -> Geospatial(MAPPED)
  within
    Geospatial(UNMAPPED)
------ Specification ----- Implementation
assert TransportModel
    \{|TransportMediumAction.occupy,TransportMediumAction.park|}
             [T= ArialCorridor
assert TransportModel
    \{|TransportMediumAction.occupy,TransportMediumAction.park|}
             [FD= ArialCorridor
```

TABLE 13

WorkCell Transport Model expressed as CSP model

```
-- WorkCell refines TransportModel
WorkCell =
  let
    Geospatial(UNMAPPED) =
        GeoAction.map -> Geospatial(MAPPED)
    Geospatial(MAPPED) =
        TransportMediumAction.occupy -> Geospatial(MAPPED)
        [ ]
        TransportMediumAction.park -> Geospatial(MAPPED)
  within
    Geospatial(UNMAPPED)
------ Specification ----- Implementation
assert TransportModel
    \{|TransportMediumAction.travel|} [T= WorkCell
assert TransportModel
    \{|TransportMediumAction.travel|} [FD=WorkCell
```

Actors Layer Elaboration

The Actors Layer represents stationary and mobile actors, both human and robotic. Actors are entities performing actions and as actors are capable of communicating with other entities in the system. Mobile actors will primarily perform the function of transporting artifacts in the system. Stationary actors will primarily perform manufacturing functions in the system. Together, stationary and mobile actors create a networked system. The actors layer relates to the OSI model for communication with other layers. In tables 14 and 15 we define the Actor model.

TABLE 14

Actor Event Alphabets expressed as CSP model

```
-- Types of Actors
datatype ActorType = Mobile | Stationary
-- Status of the Actor in the Directory
datatype DirectoryStatus = REG | UNREG | AVAILABLE |
UNAVAILABLE
-- Actors receive requests (ActorReqType) and emit messages
(ActorMsgType)
datatype ActorReqType =    get_type |
                           get_schedule |
                           get_position |
                           get_status
datatype ActorMsgType =    schedule |
                           position |
                           avail |
                           register |
                           deregister |
                           unavail
datatype ActorTypeType =   type
-- Channels that Actors sychronize on
channel ActorReq : ActorReqType
channel ActorMsg : ActorMsgType
channel service
channel ActorWhatType : ActorTypeType
datatype ActorStatusType = READY | NOTREADY
channel ActorStatus : ActorStatusType
-- The Actor process alphabet as an enumerated set
alphaActor =
{|ActorReq,ActorWhatType,ActorMsg,ActorStatus,CCFMAction,
DIRMsg,service
|}
```

TABLE 15

Actor Definition expressed as CSP model

```
-- Actor Definition
Actor =
    let
        Directory(UNREG) =
            ActorMsg.register -> ActorStatus.NOTREADY ->
                (DIRMsg.ack -> Directory(UNAVAILABLE)
                []
                DIRMsg.nack -> Directory(UNREG)
                )
        Directory(UNAVAILABLE) =
            ActorMsg.avail ->
                (DIRMsg.ack -> ActorStatus.READY ->
                                    Directory(AVAILABLE)
                []
                DIRMsg.nack -> ActorStatus.NOTREADY ->
                                    Directory(UNAVAILABLE)
                )
            |~|
            ActorMsg.deregister ->
                (DIRMsg.ack -> ActorStatus.NOTREADY ->
                                    Directory(UNREG)
                []
                DIRMsg.nack -> ActorStatus.NOTREADY ->
                                    Directory(UNAVAILABLE)
                )
        Directory(AVAILABLE) =
```

TABLE 15-continued

Actor Definition expressed as CSP model

```
            ( ActorReq.get_type -> ActorWhatType.type ->
                                    Directory(AVAILABLE)
            []
            ActorReq.get_schedule -> ActorMsg.schedule ->
                (DIRMsg.ack -> Directory(AVAILABLE)
                []
                DIRMsg.nack -> Directory(AVAILABLE)
                )
            []
            ActorReq.get_position -> ActorMsg.position ->
                (DIRMsg.ack -> Directory(AVAILABLE)
                []
                DIRMsg.nack -> Directory(AVAILABLE)
                )
            []
            ActorReq.get_status ->
                (
                    ActorStatus.READY -> Directory(AVAILABLE)
                    |~|
                    ActorStatus.NOTREADY ->
                    Directory(AVAILABLE)
                )
            )
            |~|
            service -> ActorStatus.NOTREADY ->
                                    Directory(UNAVAILABLE)
            |~|
            ActorMsg.deregister ->
                (DIRMsg.ack -> ActorStatus.NOTREADY ->
                                    Directory(UNREG)
                []
                DIRMsg.nack -> ActorStatus.NOTREADY ->
                                    Directory(UNAVAILABLE)
                )
            []
            CCFMAction.propose ->
                (
                    CCFMAction.accept -> Directory(AVAILABLE)
                    |~|
                    CCFMAction.reject -> Directory(AVAILABLE)
                )
    within
        Directory(UNREG)
assert Actor :[deadlock free]
```

TABLE 16

Mobile Actor Definition expressed as CSP model

```
------------------------------------------------------
-- Transporter
-- Mobile Transport Actor refines Actor || Transporter
------------------------------------------------------
datatype   TransportReqType = do_move | do_deliver --
get_destination |
get_eta
channel TransportReq : TransportReqType
datatype TransporterActionType = move | deliver | accept_deliver
channel TransporterAction : TransporterActionType
alphaTransporter =
{|TransporterAction,TransportReq,ActorStatus,TransportMediumAction|}
Transporter =
    let
        Directory(NOTREADY) =
            ActorStatus.READY   -> Directory(READY)
            []
            ActorStatus.NOTREADY   -> Directory(NOTREADY)
        Directory(READY) =
            ActorStatus.NOTREADY -> Directory(NOTREADY)
            []
            TransportReq.do_move
                -> TransportMediumAction.travel
                -> Directory(READY)
            []
            TransportReq.do_deliver           -- request to deliver
```

TABLE 16-continued

Mobile Actor Definition expressed as CSP model

```
                    -> TransportMediumAction.travel
                    -> TransporterAction.deliver      -- moving of
                    goods
                    -> TransporterAction.accept_deliver -- acceptance
                    -> Directory(READY)
        within
            Directory(NOTREADY)
MobileActor = Actor
            [alphaActor || alphaTransporter ] -- Alphabetised
                                              -- parallel
            Transporter                       -- composition
------ Specification ----- Implementation
assert Actor            [T=   MobileActor \
{|TransportReq,TransporterAction,TransportMediumAction|}
assert Actor            [F=   MobileActor \
{|TransportReq,TransporterAction,TransportMediumAction|}
```

Example technologies with which one might implement the Mobile Actor model are available today. In the United States, capabilities include air drone delivery services capable of carrying 5-Pound packages over 10 miles. In the United Kingdom, a robotic delivery service designed to handle local deliveries of goods has been announced. Both drones are examples of local mobile actors designed for local delivery. Long-haul drones are also appearing on the market. The United States recently saw eighteen-wheeler truck drones licensed for public road use as "autonomous heavy-duty truck." The latter example pertains to the backbone mobile actor fleet concept of the SCIM deployment model while the former example pertains to the local mobile actor fleet concept of the SCIM deployment model.

What is missing from the discourse to date is a unified model for integrating mobile actors into a manufacturing supply chain. Our Actors model fills this void.

TABLE 17

Manufacturing Actor Definition expressed as CSP model

```
-----------------------------------------------------
-- Manufacturer
-- Manufacturing Actor refines Actor || Manufacturer
-----------------------------------------------------
datatype  ManufactureReqType = do_make
channel ManufactureReq : ManufactureReqType
alphaManufacturer =
{|ManufactureReq,ArtifactAction,TransporterAction,ActorStatus|}
Manufacturer =
    let
        Directory(NOTREADY) =
            ActorStatus.READY   -> Directory(READY)
            []
            ActorStatus.NOTREADY   -> Directory(NOTREADY)
        Directory(READY) =
            ActorStatus.NOTREADY   -> Directory(NOTREADY)
            []
            TransporterAction.accept_deliver -> Directory(READY)
            []
            ManufactureReq.do_make ->
                (ArtifactAction.fabricate -> Directory(READY)
                |~|
                ArtifactAction.craft -> Directory(READY)
                |~|
                ArtifactAction.grouping -> Directory(READY)
                |~|
                ArtifactAction.identify -> Directory(READY)
                )
    within
        Directory(NOTREADY)
ManufacturingActor =  Actor
                [alphaActor || alphaManufacturer]
                Manufacturer
```

TABLE 17-continued

Manufacturing Actor Definition expressed as CSP model

```
------------- Invariant ------------------
assert ManufacturingActor :[deadlock free]
```

Artifact Layer Elaboration

The Artifact Layer represents things that are made: "manufacturables" and "meta manufacturables." Meta manufacturables are things that are made to assist in making other things. Meta manufacturables include means of identification: RFID tags, bar codes and QR codes. These are ancillary in the manufacturing process. Manufacturables are physical entities, parts or whole products. Manufacturables also include non-physical entities that are made: for example, a polish is made but is a non-physical entity. The ontology and calculus that composes physical and non-physical entities into coherent manufacturing plans that are actionable by robotic agents is defined separately in the patent "METHOD AND SYSTEM FOR AUTOMATED PRODUCT DESIGN AND OPTIMIZATION OF ROBOTIC MANUFACTURING SUPPLY-CHAINS."

The aforementioned patent models relationships between different artifacts in an ontology that facilitates systematic product descriptions and relates those to robotic capabilities. The artifact model defined here in CSP concerns itself with the behavior of processes representing artifacts and their relationship with the Supply Chain Interconnection Model. The CSP artifact model is detailed in tables 18 and 19.

TABLE 18

Artifact Model Definition expressed as CSP model

```
datatype ArtifactType = Manufacturable | MetaManufacturable
datatype ManufacturableType = PhysicalEntity | NonPysicalEntity
datatype ArtifactActionType = fabricate| craft | grouping | identify
channel ArtifactAction : ArtifactActionType
ArtifactModel = ArtifactAction.fabricate -> ArtifactModel
            -- fabricate as applied to physical materials
            [ ]
            ArtifactAction. craft -> ArtifactModel
            -- craft as applied to non physical manufacturables,
            --    for example "a shine" or "a polish"
            [ ]
            ArtifactAction.grouping -> ArtifactModel
            [ ]
            ArtifactAction.identify -> ArtifactModel
```

Artifacts are distinguished by their type and purpose. Physical artifacts are products, parts—tangible entities. Non-physical artifacts are those without mass, for example a shine, a brushed surface etc. Finally, there are meta-artifacts, those created to assist in the manufacture of other artifacts. For example an injection molding sprue of a model kit serves the purpose of grouping the individual parts, which are attached to it. Likewise RFID tags and OCR codes may serve the purpose of identifying artifacts. These artifacts exist to describe others—hence the term "meta." Appropriate definitions may be found in table 19.

TABLE 19

Artifact Types expressed as CSP model

```
PhysicalArtifact = ArtifactAction.fabricate -> PhysicalArtifact
------ Specification ----- Implementation
assert ArtifactModel
        \{|ArtifactAction.craft,
            ArtifactAction.grouping,
```

TABLE 19-continued

Artifact Types expressed as CSP model

```
        ArtifactAction.identify|}
                [T= PhysicalArtifact
assert ArtifactModel
        \{|ArtifactAction.craft,
            ArtifactAction.grouping,
            ArtifactAction.identify|}
                [FD= PhysicalArtifact
NonPysicalArtifact = ArtifactAction.craft -> NonPysicalArtifact
------ Specification ----- Implementation
assert ArtifactModel
        \{|ArtifactAction.fabricate,
            ArtifactAction.grouping,
            ArtifactAction.identify|}
                [T= NonPysicalArtifact
assert ArtifactModel
        \{|ArtifactAction.fabricate,
            ArtifactAction.grouping,
            ArtifactAction.identify|}
                [FD= NonPysicalArtifact
MetaArtifact = ArtifactAction.grouping -> MetaArtifact
        [ ]
        ArtifactAction.identify -> MetaArtifact
------ Specification ----- Implementation
assert ArtifactModel
        \{|ArtifactAction.fabricate,
            ArtifactAction.craft|}
                [T= MetaArtifact
assert ArtifactModel
        \{|ArtifactAction.fabricate,
            ArtifactAction.craft|}
                [FD= MetaArtifact
```

Supply Layer Elaboration

The Supply Layer accommodates the core functions of the Supply Chain Interconnection Model and coordinates the other layers—relating for its network communication to the OSI model of the Internet. Please refer to FIG. 5.—"Supply Chain Interconnection Model (SLIM)." The Supply Layer encompasses both a service-oriented architecture as well as peer-to-peer technology. The core functions of the Supply Layer are as described: (a) Robotic Capability Model & Manufacturing Ontology System; (b) Vehicle-Routing & Fleet-Optimization Model; (c) Certificate & Security Model; (d) Directory Services Model; (e) Geospatial Model; and (f) Consensus Contract-And-Feedback Model.

The "Robotic Capability Model" and the "Manufacturing Ontology System" are defined separately in the patent "ROBOTIC CAPABILITY MODEL FOR ARTIFICIAL INTELLIGENCE ASSISTED MANUFACTURING SUPPLY CHAIN PLANNING." In brief, these comprise a system to enable artificial intelligence supported product design in an automated manufacturing setting employing the use of robots. For clarity, the SUPPLY layer definition is repeated here.

TABLE 20

Supply Layer Definition expressed as CSP model

```
-----------------------
-- SUPPLY LAYER DEFINED
-----------------------
SUPPLY =    CCFM                            -- Consensus Contract-And-
                                            --   Feedback Model
            [|{|CertAct,CCFMAction|}|]
            (
                GEO                         -- Geopatial Model
                [|{|GeoActionRef|}|]
                ( VRP                       -- Vehicle-Routing &
                                            --   Fleet-Optimization Model
                    [|{|DIRmsg|}|]
                    ( CERT                  -- Certificate
                                            -- & Security Model
                        [|{|CertAct|}|]
                        ( DIR               -- Directory Services Model
                            [|{|RCMMsg,RCMReq|}|]
                            RCM             -- Robotic Capability Model
                        )
                    )
                )
            )
```

Consensus Contract and Feedback Model

The Consensus Contract and Feedback Model accommodates smart contract negotiation and feedback lodgment. In an early section, we asserted that the Supply Chain Interconnection Model derives its productivity multiplier from, among other things, the swift and continual inter-operation of actors as directed by the supply layer. The Consensus Contract and Feedback Model is directed at this requirement. Contracts for service may be negotiated directly on a peer-to-peer network and a record of contracts remains on a peer-to-peer ledger. An area of particular concern in a highly distributed manufacturing environment is how to manage quality control. Correction of inadequate processes must be immediate, impartial and trusted. Candidate technologies that have emerged recently which fit this role are blockchain consensus protocols and associated smart contracts, based on Federated Byzantine Agreement.

The model presented here does not advocate particular implementations but rather models consensus as a CSP abstraction. The model may be implemented based on Federated Byzantine Agreement, which has several commercial and open source implementations. Described here is the integration of peer-to-peer consensus into a manufacturing supply chain in order to agree contracts and provide quality feedback.

Table 21 defines the Consensus Contract and Feedback Model for CSP in the context of the Supply Chain Interconnection Model (SCIM).

TABLE 21

Consensus Contract and Feedback Model expressed as CSP model

```
-- Consensus Contract & Feedback Model
datatype CCFMState = UNCOMMITTED | VOTING |   COMMITTED
datatype CCFMActionType = sync | propose | accept | reject | respond
datatype CCFMLedgerState = SYNCHRONIZED | UNSYNCHRONIZED
channel   CCFMAction : CCFMActionType
CCFM =
   let
       Ledger(UNSYNCHRONIZED) =
             CCFMAction.sync -> CertAct.trust ->
                (CertAct.authorize -> Ledger(SYNCHRONIZED)
                [ ]
                  CertAct.noauthorize -> Ledger(UNSYNCHRONIZED)
                )
       Ledger(SYNCHRONIZED) =
       let
          Consensus(UNCOMMITTED) =
              CCFMAction.propose -> CertAct.trust ->
                 (CertAct.authorize -> Consensus(VOTING)
                 [ ]
                   CertAct.noauthorize ->
                   Consensus(UNCOMMITTED)
                 )
          Consensus(VOTING) =
              CCFMAction.accept -> CertAct.trust ->
                 (CertAct.authorize -> Consensus(COMMITTED)
                 [ ]
                   CertAct.noauthorize -> Consensus(VOTING)
                 )
                 [ ]
              CCFMAction.reject -> CertAct.trust ->
                 (CertAct.authorize -> Consensus(COMMITTED)
                 [ ]
                   CertAct.noauthorize -> Consensus(VOTING)
                 )
          Consensus(COMMITTED) =
              CCFMAction.respond -> Consensus(UNCOMMITTED)
       within
            Consensus(UNCOMMITTED)
   within
       Ledger(UNSYNCHRONIZED)
------ Invariant -----------
assert CCFM :[deadlock free]
```

Geospatial Reference Model

The Geospatial Reference Model provides mapping functionality for transport capability.

TABLE 22

Geospatial Reference Model expressed as CSP model

```
-- Geospatial Reference Model
datatype   GeoStatusType = MAPPED | UNMAPPED
datatype   GeoActionType = map
datatype   GeoActionRefType = reference_map
channel    GeoAction : GeoActionType
channel    GeoActionRef : GeoActionRefType
GEO = GeoAction.map -> GEO
      [ ]
          GeoActionRef.reference_map -> GEO
```

Vehicle Routing and Fleet Optimization Model

The Vehicle Routing and Fleet Optimization Model provides on-demand route planning for mobile actors and fleets. In an early section, we asserted that the Supply Chain Interconnection Model derives its productivity multiplier from, among other things, the swift and continual inter-operation of actors as directed by the supply layer. The Vehicle Routing and Fleet Optimization Model is directed at this requirement. It aims to minimize costs and transport times for individual routes and whole fleets. It is envisaged that this is a distributed service that optimizes fleets for manufacturing clusters as well for the transport backbone.

Implementations of Vehicle Routing and Fleet Optimization include commercial and open source variants. As with the Actors model, we do not advocate a vendor specific implementation but rather model integration into the Supply Chain Interconnection Model (SCIM) in terms of the process calculus CSP.

TABLE 23

Vehicle Routing and Fleet Optimization Model expressed as CSP model

```
-- Vehicle Routing Planner & Fleet Optimization Model
datatype VRPReqType   = order_source_destination
datatype VRPMsgType = route_schedule
channel VRPReq : VRPReqType
channel VRPMsg : VRPMsgType
VRP =
    let
        Geospatial(UNMAPPED) =
             GeoActionRef.reference_map -> Geospatial(MAPPED)
        Geospatial(MAPPED) =
             VRPReq.order_source_destination ->
                VRPMsg.route_schedule ->
                   VRP
        [ ]
        ActorMsg.schedule -> VRP    -- Actor registers its
        [ ]                         -- current schedule.
        ActorMsg.position -> VRP    -- Actor registers its
        [ ]                         -- current position.
        DIRStatus.online -> VRP     -- Directory advises actor
        [ ]                         -- is online.
        DIRStatus.offline -> VRP    -- Directory advises actor
                                    -- is offline.
    within
       Geospatial(UNMAPPED)
--------- Invariant -------
assert VRP :[deadlock free]
```

Certificate and Security Model

The Certificate and Security Model provides authentication and may provide non-repudiation and confidentiality. It is envisaged that this is a centralized service.

Security certificates are offered commercially. As with the Actors model, we do not advocate a vendor specific implementation but rather model integration into the Supply Chain Interconnection Model (SCIM) in terms of the process calculus CSP.

TABLE 24

Certificate and Security Model expressed as CSP model

```
-- Certificate & Security Model
datatype CertActType   = trust | authorize | noauthorize
channel CertAct : CertActType
CERT = CertAct.trust ->
          (CertAct.authorize -> CERT
          |~|
            CertAct.noauthorize -> CERT
          )
```

Directory Service Model

The Directory Service provides registration capability for robotic actors and optionally for product descriptions. Please refer to table 25 for process logic.

TABLE 25

Directory Service expressed as CSP model

```
---------------------
-- Directory Service
---------------------
datatype DIRMsgType    = ack | nack
channel DIRMsg : DIRMsgType
datatype DIRStatusType = online | offline
channel DIRStatus : DIRStatusType
DIR =
    -- actor registers
    ActorMsg.register -> CertAct.trust ->
        (CertAct.authorize ->
            (RCMReq.get_robot_definition ->
                (
                    RCMMsg.robot_definition ->
                        DIRMsg.ack ->
                        DIRStatus.offline ->
                        DIR
                    []
                    RCMMsg.rcm_fail -> DIRMsg.nack -> DIR
                )
            )
        []
        CertAct.noauthorize -> DIRMsg.nack -> DIR
        )
    []
    -- actor deregisters
    ActorMsg.deregister -> CertAct.trust ->
        (CertAct.authorize -> DIRMsg.ack -> DIRStatus.offline -> DIR
        []
        CertAct.noauthorize -> DIRMsg.nack -> DIR
        )
    []
    -- actor indictes availability
    ActorMsg.avail -> CertAct.trust ->
        (CertAct.authorize -> DIRMsg.ack -> DIRStatus.online -> DIR
        []
        CertAct.noauthorize -> DIRMsg.nack -> DIR
        )
    []
    -- actor indicates unavailability
    ActorMsg.unavail -> CertAct.trust ->
        (CertAct.authorize -> DIRStatus.offline -> DIR
        []
        CertAct.noauthorize -> DIRMsg.nack -> DIR
        )
    []
    -- actor registers its work/travel schedule
    ActorMsg.schedule -> CertAct.trust ->
        (CertAct.authorize -> DIRMsg.ack -> DIR
        []
        CertAct.noauthorize -> DIRMsg.nack -> DIR
        )
    []
    -- actor advises its position
    ActorMsg.position -> CertAct.trust ->
        (CertAct.authorize -> DIRMsg.ack -> DIR
        []
        CertAct.noauthorize -> DIRMsg.nack -> DIR
        )
------ Invariant ----------
assert DIR :[deadlock free]
```

Robotic Capability Model

The Robotic Capability Model facilitates artificial intelligence supported product design in an automated manufacturing setting employing the use of robots. The use case supported by Robotic Capability Model is as described. Given a population of robots and a systematic product description, the described technology will be able to do the following: (a) Answer the question as to whether a product can be built—a feasibility analysis; (b) Detail the exact operations required to build a product end-to-end; (c) Formulate a manufacturing plan describing the robots required to build a product; and (d) Apply optimization constraints to feasibility analyses and manufacturing plans.

In an early section, we asserted that the Supply Chain Interconnection Model derives its productivity multiplier from, among other things, the swift and continual interoperation of actors as directed by the supply layer. The Robotic Capability Model is directed at this requirement.

The Robotic Capability Model is defined separately in the patent "METHOD AND SYSTEM FOR AUTOMATED PRODUCT DESIGN AND OPTIMIZATION OF ROBOTIC MANUFACTURING SUPPLY-CHAINS." The CSP model for the Robotic Capability Model is defined table 26.

TABLE 26

Robotic Capability Model expressed as CSP model

```
---------------------------
-- Robotic Capability Model
---------------------------
datatype RCMReqType    = get_product_definition       |
                         get_production_plan          |
                         get_robot_definition         |
                         register_product_definition  |
                         register_robot_definition
datatype RCMMsgType    = product_definition           |
                         production_plan              |
                         robot_definition             |
                         rcm_fail
-- Channels that RCM synchronizes on
-- These are both client interfaces
channel RCMReq : RCMReqType
channel RCMMsg : RCMMsgType
RCM = RCMReq.register_product_definition
      -> RCM
    []
    RCMReq.register_robot_definition -> RCM
    []
    RCMReq.get_product_definition ->
    RCMMsg.product_definition -> RCM
    []
    RCMReq.get_production_plan ->
    RCMMsg.production_plan -> RCM
    []
    RCMReq.get_robot_definition ->
    RCMMsg.robot_definition   -> RCM
------ Invariant ----------
assert RCM : [deadlock free]
```

It is envisaged that the Robotic Capability Model is a distributed service that operates on manufacturing clusters with a root service coordinating query distribution and data replication. We define an indexed Robotic Capability Model using a parameterized variant of the Robotic Capability Model as shown in table 27. Other services hitherto represented as non-distributed may be parallelized and distributed in the same manner. CSP and FDR continue to provide of correctness.

TABLE 27

Indexed Robotic Capability Model expressed as CSP model

```
---------Indexed RCM--------------
MANUFACTURING_CLUSTER_NUMBERS = 10
RCM_SERVICE_NUMBER =
MANUFACTURING_CLUSTER_NUMBERS + 1
---- Node zero is root node
RCM_DISTRIBUTED = ||| x : {0..RCM_SERVICE_NUMBER} @
RCM(x)
```

Inversion of Processing and Processing Overhead

The Robotic Capability Model, the Actor Model, and the Vehicle Routing and Fleet Optimization Model combine to invert the mode of operation of the traditional supply chain not only from a push-strategy model to a pull-strategy model but critically from a model centered on the notion of a supply chain where parts are moved between manufacturers providing value add processes to the notion of a grid of manufacturing clusters of low cost manufacturing facilities. As automation decreases the cost of manufacturing for individual processing steps in the sequence of steps required to manufacture products, productivity and manufacturing volumes are increased through lowering the overheads between manufacturing steps and restructuring the overall process to reflect this. The Robotic Capability Model and the Vehicle Routing and Fleet Optimization Model achieve an inversion of the dynamic between processing and processing overhead.

So called "big data" information systems leverage a similar inversion of the dynamic between processing and processing overhead today—but for such information systems the driving factor is an explosion of data volume, leading to a push for architectures designed to accommodate this volume. In manufacturing, by contrast, the driving factor is the lowering of costs through automation. Our architecture is designed to pull these lowered costs through to larger manufacturing volumes.

Please refer to FIG. 6. "Inter-Network Systems Model," FIG. 9. "Traditional Data Flow in Information Systems," FIG. 11 "Traditional Supply Chain Model Mirrors Data Flow in Information Systems", FIG. 10 "Big Data Inversion of Process and Process-Overhead" and FIG. 12 "Inversion of Process and Process-Overhead in Manufacturing" for an illustration of the described inversion of the dynamic between processing and processing overhead and how this architecture expresses itself in the SCIM deployment model.

What is claimed is:

1. A computer-implemented method for operating a robotic manufacturing network, comprising:
   (a) providing a communications network;
   (b) providing a plurality of computer processor nodes for processing data wherein said computer processor nodes are participants on said communication network;
   (c) providing a plurality of manufacturing facilities configured to:
      (i) receive manufacturing instructions;
      (ii) receive input materials and/or products;
      (iii) output products according to received manufacturing instructions;
   (d) providing a plurality of transport agents connecting said manufacturing facilities configured to:
      (i) transport input materials to and from said manufacturing facilities;
      (ii) transport products to and from said manufacturing facilities;
   (e) providing a plurality of actors selected from the group consisting of said manufacturing facilities and said transport agents wherein said actors are participants in said robotic manufacturing network and communicate on said communications network;
   (f) providing a robotic capability model as manufacturing supply chain planning service configured to:
      (i) execute on one or more of said computer processor nodes;
      (ii) receive requests for registration of robotic capabilities;
      (iii) receive requests for manufacturing plans to fulfill product specifications;
      (iv) transform product specification into manufacturing plans detailing manufacturing instructions relating steps of manufacture to capabilities is provided by one or more of said manufacturing facilities;
      (v) send replies with manufacturing plans for products specifications; and
   whereby autonomous manufacturing supply chain functionality is created that transforms product specifications into optimized manufacturing production plans thereby permitting products to be made by a population of networked manufacturing agents.

2. The computer-implemented method of claim 1, further providing:
   (g) a directory as service configured to:
      (i) execute on one or more of said computer processor nodes;
      (ii) receive requests for registration and/or deregistration of said actors with associated capabilities;
      (iii) verify all requests for registration of said actors against said robotic capability model to ensure directory registered capabilities are compatible with capabilities registered in said robotic capability model;
      (iv) receive request for registration information about said actors;
      (v) reply by sending registration information about said actors; and
   whereby autonomous manufacturing supply chain functionality is augmented with the ability to broker individual execution steps of manufacturing plans through a directory service.

3. The computer-implemented method of claim 1, further providing:
   (h) a vehicle route planner as service configured to:
      (i) execute on one or more of said computer processor nodes;
      (ii) receive routing requests to plan routes between two or more locations;
      (iii) reply to routing requests with routing plans; and
   whereby autonomous manufacturing supply chain functionality is augmented with the ability to optimize the execution steps of manufacturing plans and associated conveyance of materials and/or products.

4. The computer-implemented method of claim 1, further providing:
   (j) a consensus service for agreement of contracts configured to:
      (i) execute on one or more of said computer processor nodes;
      (ii) maintain a distributed storage of information on contract agreements or a distributed ledger which is synchronized among peers participating in said consensus service through sending and receiving of synchronization messages;
      (iii) receive proposals for addition to information and/or changes to information in said global ledger,
      (iv) send and/or receive messages to negotiate agreement about acceptance or refusal of such proposals;
      (v) record the outcome of agreement and/or refusal of such proposals in said global ledger; and
   whereby autonomous manufacturing supply chain functionality is augmented with peer-to-peer contract agreement for individual execution steps of manufacturing production plans and/or associated conveyance of material and/or products.

5. The computer-implemented method of claim 1, further providing:
   (k) a certificate service for authentication configured to:
      (i) execute on one or more of said computer processor nodes;
      (ii) receive requests for authentication;
      (iii) send authentication acknowledgements; or
      (iv) send authentication refusals; and whereby access to said directory is secured and non-repudiation is offered to secure information in said directory.

6. The computer-implemented method of claim 1, wherein said robotic capability model is further configured to: receive requests to retrieve robot capability specifications; send replies with robot capability specifications; and whereby access to robot capability specifications is enabled for human operators and client software programs.

7. The computer-implemented method of claim 1, wherein said vehicle route planner is further configured to: receive notifications of availability of said actors; and/or receive notifications of position of said actors; and/or receive notifications of schedule of said actors; whereby route optimization of whole fleets is enabled.

8. The computer-implemented method of claim 1, wherein said consensus service is further configured to maintain information about contract execution feedback in said distributed storage of state information or a distributed ledger, whereby said consensus service enables real-time quality control feedback configured to be used in manufacturing plan optimization.

9. The computer-implemented method of claim 1, wherein said consensus service is further configured to maintain information about contract payment in said distributed storage of state information or a distributed ledger, whereby said consensus service enables real-time payment for contract fulfillment.

10. The computer-implemented method of claim 1, wherein said manufacturing facilities are grouped into local manufacturing clusters and said transport agents are specialized into groups of local transport agents connecting said manufacturing facilities within local clusters and into groups of long distance transport agents inter-connecting local clusters and wherein manufacturing capabilities are duplicated between local manufacturing clusters whereby an inter-network of manufacturing clusters is formed and manufacturing plans are optimized for local manufacture deriving a productivity multiplier from rapid inter-operation of manufacturing facilities.

11. The computer-implemented method of claim 1, further providing
(l) a geospatial reference service for mapping configured to:
  (i) execute on one or more of said computer processor nodes;
  (ii) receive map updates;
  (iii) receive map reference data requests;
  (iv) reply to map reference data requests with map reference data; and
wherein said vehicle route planner is further configured to request and receive map reference data from said geospatial reference service to initialize the operation of said vehicle route planner whereby said vehicle route planner is configured to outsource map reference data provision.

12. The computer-implemented method of claim 1, wherein said directory is further configured to: receive notifications of availability of said actors; receive notifications of schedule of said actors; receive notifications of position of said actors; receive requests for information about availability of said actors; reply by sending availability information about said actors; receive requests for information about schedule of said actors; reply by sending schedule information about said actors; receive requests for information of position about said actors; reply by sending position information about said actors; and whereby said directory is extended from providing a registry of actors with specific capabilities to provide dynamic status information about actors which is utilized by other clients or services.

13. The computer-implemented method of claim 1, wherein said actors is further configured to: send notifications of registration and/or deregistration; send notifications of availability; send notifications of schedule; send notifications of position; and
whereby said manufacturing facilities and transport agents are connected to said directory for querying of status of said manufacturing sites and said transport agents to enable brokerage of services and dynamic optimization of said vehicle route planner.

14. The computer-implemented method of claim 1, further providing:
(m) one or more manufacturing proxies configured to:
  (i) receive manufacturing instructions and relay said manufacturing instructions to a manufacturing agent;
  (ii) receive input materials and/or products and relay said input materials and/or products to a manufacturing agent;
  (ii) receive and forward products made by a manufacturing agent according to received manufacturing instructions; and
whereby non-robotic manufacturing facilities are integrated and human manufacturers are configured to function within said robotic manufacturing network.

15. The computer-implemented method of claim 1, further including one or more roads configured to facilitate conveyance of materials and/or products.

16. The computer-implemented method of claim 1, further including one or more rail roads configured to facilitate conveyance of materials and/or products.

17. The computer-implemented method of claim 1, further including one or more aerial corridors configured to facilitate conveyance of materials and/or products.

18. The computer-implemented method of claim 1, further including one or more waterways configured to facilitate conveyance of materials and/or products.

19. The computer-implemented method of claim 1, further including one or more tubular transport system configured to facilitate conveyance of materials and/or products.

20. The computer-implemented method of claim 1, further including one or more floor routing systems configured to facilitate conveyance of materials and/or products.

* * * * *